(12) United States Patent
Rice

(10) Patent No.: US 8,333,181 B1
(45) Date of Patent: Dec. 18, 2012

(54) PAINTBALL MARKER WITH QUICK ACCESS RECEIVER

(75) Inventor: John R. Rice, Staffordshire (GB)

(73) Assignee: Tippmann Sports, LLC, Fort Wayne, IN (US)

( * ) Notice: Subject to any disclaimer, the term of this patent is extended or adjusted under 35 U.S.C. 154(b) by 0 days.

(21) Appl. No.: 13/528,218

(22) Filed: Jun. 20, 2012

Related U.S. Application Data

(60) Provisional application No. 61/498,783, filed on Jun. 20, 2011.

(51) Int. Cl.
*F41B 11/00* (2006.01)
(52) U.S. Cl. .......................................... 124/73
(58) Field of Classification Search ............... 124/71–77, 124/1
See application file for complete search history.

(56) References Cited

U.S. PATENT DOCUMENTS

| | | | |
|---|---|---|---|
| 5,722,383 A | 3/1998 | Tippmann, Sr. et al. | |
| 7,594,503 B2* | 9/2009 | DeHaan et al. | 124/74 |
| 7,665,396 B1* | 2/2010 | Tippmann, Jr. | 89/7 |
| 7,770,571 B2 | 8/2010 | Tippmann, Jr. et al. | |
| 7,900,622 B2* | 3/2011 | Douglas et al. | 124/73 |
| 8,015,907 B2* | 9/2011 | Tippmann, Sr. | 89/7 |
| 8,186,338 B2* | 5/2012 | DeHaan et al. | 124/74 |
| 2007/0215134 A1* | 9/2007 | DeHaan et al. | 124/77 |
| 2008/0099005 A1* | 5/2008 | Kaakkola et al. | 124/74 |
| 2008/0190275 A1* | 8/2008 | Tippmann | 89/7 |
| 2009/0025701 A1* | 1/2009 | Douglas et al. | 124/77 |
| 2009/0120420 A1* | 5/2009 | Tippmann et al. | 124/73 |
| 2010/0024791 A1* | 2/2010 | Romney | 124/65 |
| 2010/0071679 A1* | 3/2010 | DeHaan et al. | 124/77 |
| 2012/0210992 A1* | 8/2012 | DeHaan et al. | 124/77 |

OTHER PUBLICATIONS

Operator's Manual for Browning .50 Caliber Machine Gun; Aug. 1992.
Bushmaster; "Operating and Safety Instruction Manual" (for all Bushmaster XM15 Models), 1999.
Tippmann; 98 Custom™ Marker Line—Owner's Manual.
Tippmann; X7Phenom X7Phenom Mechanical; Owner's Manual; TP04121; Rev. Aug. 2010.
Tippmann; A-5 Paintball Marker; Owner's Manual; TP04122; Rev. Oct. 2010.

* cited by examiner

*Primary Examiner* — Michael David
(74) *Attorney, Agent, or Firm* — Barnes & Thornburg LLP

(57) ABSTRACT

A paintball marker with a barrel having a bore dimensioned to receive a frangible projectile. The marker has a receiver defining an interior cavity with a breech area. The receiver includes a flip top portion that is, in some embodiments, pivotally connected to the receiver. The flip top portion is configured to pivot between an open position that provides access to the interior cavity and a closed position that blocks access to the interior cavity. A valve arrangement is provided to selectively allow flow between a supply of compressed gas and the breech area to propel frangible projectiles through the barrel. The marker has a firing assembly configured to actuate the valve arrangement in response to actuation of a trigger.

20 Claims, 25 Drawing Sheets

PAINTBALL MARKER WITH QUICK ACCESS RECEIVER

RELATED APPLICATIONS

This application claims the benefit of U.S. Provisional Application No. 61/498,783 filed Jun. 20, 2011, for a "Paintball Marker with Quick Access Receiver," which is hereby incorporated by reference in its entirety.

TECHNICAL FIELD

This invention relates generally to devices for propelling frangible projectiles, such as paintballs, and particularly to a receiver for such a device that provides quick access to internal components for service and maintenance.

BACKGROUND

Devices that fire frangible projectiles are known in the art. For example, marking guns (commonly known as paintball guns or paintball markers) typically use compressed gas to propel frangible projectiles. The frangible projectiles commonly have a gelatinous or plastic shell designed to break upon impact. Typically, the shells are filled with a marking material, such as paint, and/or an immobilizing material, such as a noxious chemical.

These types of devices have a wide variety of applications. For example, a popular recreational use is in paintball games, in which opposing sides attempt to seek out and "shoot" one another with paintballs. Frangible projectiles have also been used to segregate cattle within a herd. Likewise, law enforcement personnel employ frangible projectiles with immobilizing materials for crowd control.

Periodically, these devices must be cleaned, serviced and/or repaired. When this happens, the device is typically disassembled, which can be a complex and timely process. Therefore, there exists a need for a paintball marker that more easily provides access to internal components for maintenance and servicing.

SUMMARY

Accordingly to one aspect, the invention provides a paintball marker with a flip top portion that moves between a closed position and an open position that provides access to internal components. In one embodiment, the paintball marker has a barrel with a bore dimensioned to receive a frangible projectile. A receiver is provided that defines an interior cavity with a breech area. The receiver includes a flip top portion that is movable between an open position and a closed position. The marker includes a valve arrangement configured to selectively allow flow between a supply of compressed gas and the breech area to propel the frangible projectile through the barrel. A front bolt is movable between a first position and a second position to push the frangible projectile towards the barrel. The marker includes a rear bolt connected to the front bolt with a linkage arm that is movable between a cocked position and a firing position. The rear bolt is configured to actuate the valve assembly when the rear bolt moves from the cocked position to the firing position. A drive spring is configured to urge the rear bolt toward the firing position. The marker has a firing assembly configured to selectively release the rear bolt in response to actuation of a trigger. Typically, the flip top portion is configured to move between an open position that provides access to a top portion of the front bolt and a top portion of the rear bolt and a closed position that blocks access to the top portion of the front bolt and the top portion of the rear bolt.

For example, the flip top portion could divide the receiver along a substantially horizontal plane that intersects the breech area in the open position to expose the top portion of the front bolt and the top portion of the rear bolt for substantially the entire length of the front bolt and the rear bolt. In some cases, the flip top portion longitudinally divides the receiver in an open position along a plane that approximately intersects or bisects the barrel. Embodiments are contemplated in which the flip top portion longitudinally divides the receiver in an open position along a plane that approximately intersects the front bolt and the rear bolt. In one embodiment, the flip top portion pivots between the open position and the closed position.

According to another aspect, the invention provides a paintball marker with a receiver having a wall that is movable to an open position that provides access to internal components. In one embodiment, the paintball marker includes a barrel having a bore dimensioned to receive a frangible projectile, such as a paintball. A receiver is provided that includes a plurality of walls defining an interior cavity with a breech area. The marker includes a valve arrangement configured to selectively allow flow between a supply of compressed gas and the breech area to propel frangible projectiles through the barrel. The valve arrangement is actuated by a firing assembly in response to actuation of a trigger. The receiver has at least one wall that is movable with respect to the other walls between an open position that provides access to the receiver's interior cavity for servicing the marker and a closed position that blocks access to the interior cavity. In some cases, the wall that is movable with respect to the other walls extends longitudinally substantially the entire length of the receiver.

Embodiments are contemplated in which the wall that is movable with respect to the other walls of the receiver pivots between the open and closed positions. For example, the wall could pivot about an axis that is approximately perpendicular to a longitudinal axis of the receiver. In some cases, the wall is pivotally connected to the rear portion of receiver.

Typically, the wall that is movable with respect to the other walls has a distal end adjacent to the barrel. In some cases, the distal end has an arcuate shape to form a substantially uninterrupted surface with the bore in the barrel. Depending on the circumstances, the distal end could have external threads that mate with internal threads of a fastener. In one embodiment, a flange, such as a snap ring, extends from the barrel that is received by the fastener to form an interference fit between the barrel and the receiver. In other embodiments, the barrel may include external threads that mate with internal threads of the receiver.

Embodiments are contemplated in which the receiver includes spaced-apart side walls, an upper wall, and a bottom wall that define the interior cavity of the receiver. In this embodiment, the upper wall is movable with respect to the side walls between an open position that opens the interior cavity to external access for servicing the marker and a closed position that blocks access to the interior cavity. Typically, the upper wall pivots between the open position and the closed position.

According to another aspect, the invention provides a receiver for a paintball marker. The receiver has spaced-apart side walls, an upper wall extending between the side walls from which a feed neck extends, and a bottom wall extending between the side walls from which a trigger guard extends. These walls define an interior cavity dimensioned to receive internal components of a paintball marker. The upper wall is movable with respect to at least one of the side walls between an open position that provides access to the interior cavity and a closed position that blocks access to the interior cavity. In some cases, the upper wall pivots between the open position and the closed position. For example, the upper wall could pivot about an axis that is approximately perpendicular to a longitudinal axis of the receiver. In some embodiments, the upper wall has a proximate end pivotally connected to at least one of the side walls in close proximity to the rear end of the receiver. In some cases, the upper wall has a distal end with an arcuate shape with external threads.

According to a further aspect, the invention provides a method of servicing a paintball marker. The method includes the step of providing a paintball marker with an upper wall of a receiver having a proximal end pivotally connected to a rear portion of a receiver and a distal end threadably connected with a fastener. The fastener is disconnected from the receiver to release the distal end of the upper wall. This allows the upper wall to be pivoted about the pivotal connection to provide access to an interior cavity of the receiver.

According to another aspect, the invention provides a paintball marker with a feed neck that may be quickly released from the receiver. For example, the feed neck may be associated with a latch assembly that is movable between a locked position and an unlocked position. In the locked position, the latch assembly prevents the feed neck from being removed from the receiver. In the unlocked position, the latch assembly releases the feed neck from the receiver so that the feed neck may be removed, such as for maintenance and/or replacement.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF DRAWINGS

The present disclosure will be described hereafter with reference to the attached drawings which are given as non-limiting examples only, in which.

Figure 1:
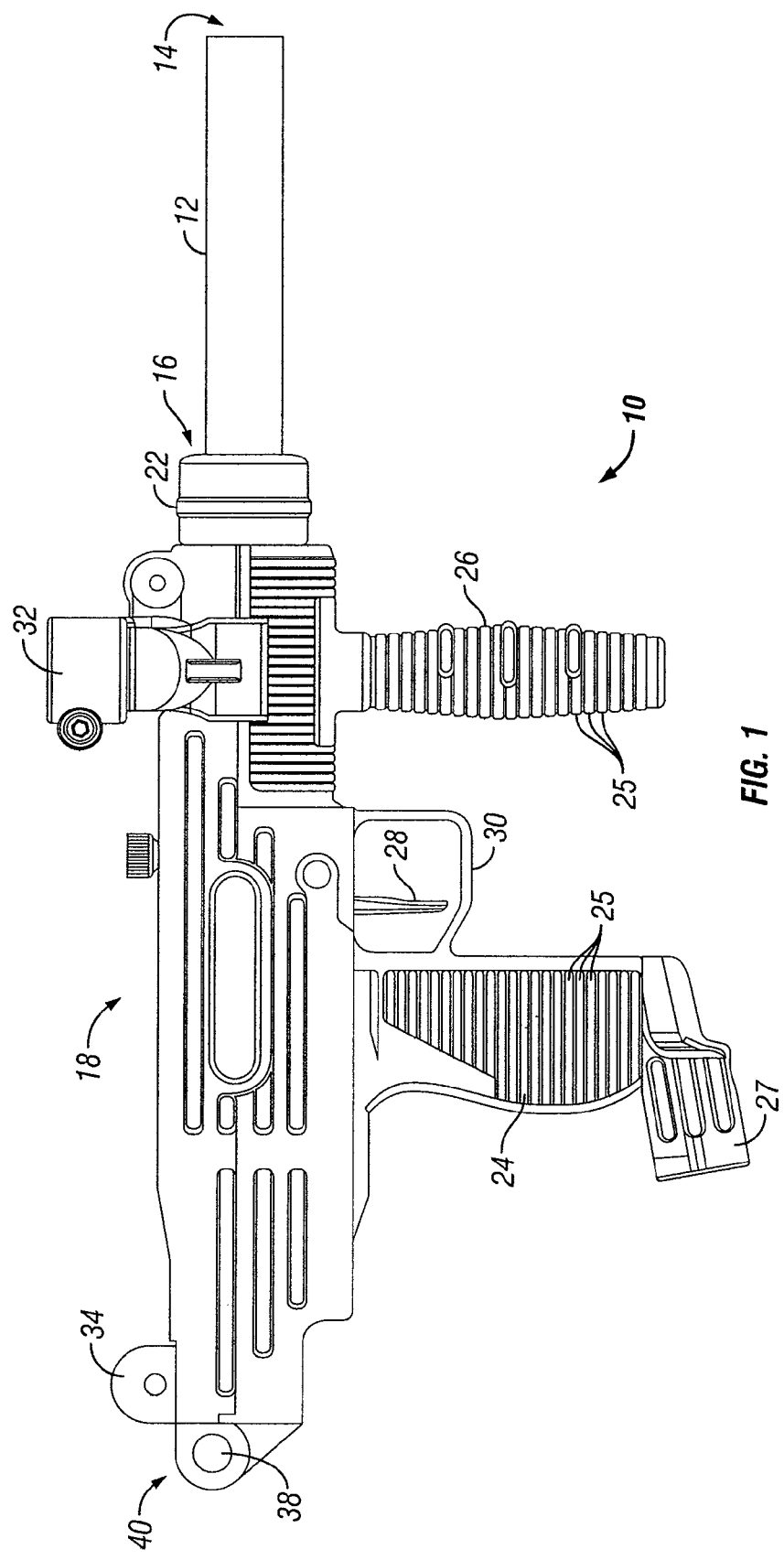
FIG. 1 is a right side view of a paintball marker according to an embodiment of the present invention.

Corresponding reference characters indicate corresponding parts throughout the several views. The components in the Figures are not necessarily to scale, emphasis instead being placed upon illustrating the principles of the invention. The exemplification set out herein illustrates embodiments of the invention, and such exemplification is not to be construed as limiting the scope of the invention in any manner.

DETAILED DESCRIPTION OF THE DRAWINGS

FIG. 1 shows an example paintball marker 10 according to an embodiment of the present invention. Although this marker 10 will be discussed in terms of a compressed gas marker for purposes of example, it should be appreciated that the present invention could be implemented in compressed or combustible gas-powered markers. Moreover, the invention could be implemented in a manual, semi-automatic, or automatic marker, even though a semi-automatic marker is shown for purposes of illustration.

As shown, the marker 10 includes a barrel 12 with a muzzle end 14 and a breech end 16. The breech end 16 of the barrel 12 may attach to the receiver 18, such as by screwing the breech end 16 into the receiver 18. By way of other examples, the barrel 12 may attach to the receiver 18 with an interference fit, frictional fit, threaded engagement, or unitary formation. The barrel 12 includes a bore 20 (FIG. 3) dimensioned to receive a frangible projectile, such as a paintball. When the marker 10 is fired, the projectile passes through the bore 20 in the barrel 12 and exits through the muzzle end 14. In the example shown, the marker 10 includes a fastener 22 that secures the barrel 12 and maintains a portion of the receiver 18 in the closed position as discussed below. In other embodiments, the fastener may not secure the barrel 12. For example, as shown in the embodiment illustrated on FIG. 17, the barrel 12 may include external threads that mate with internal threads of the receiver 18. In such an embodiment, the barrel 12 could be independently mounted/removed to/from the receiver 18 without removing the fastener 22.

In the example shown, the marker 10 includes a grip 24 that is dimensioned for a user to gasp. In the example shown, the marker 10 includes an optional vertical grip 26 that a user may grasp with his/her other hand to steady the marker 10. As shown, the grip 24 and vertical grip 26 include optional surface ornamentation 25 to make both easier to grip. By way of another example, the marker 10 may be formed without a grip. For example, the marker 10 may be shaped like a rifle in which the user holds the marker 10 via the receiver 18 and a butt stock. In the example shown, a tank adapter 27 extends from the grip 26. The tank adapter 27 may be connected to a canister of compressed gas, such as carbon dioxide or nitrogen, to supply compressed gas to the marker 10. Embodiments are also contemplated in which the receiver 18 could have internal passages that connect to a remote line for supplying compressed gas instead of using a tank adapter 27.

As shown, the marker 10 has a trigger assembly with a trigger 28 for actuation by the user to fire the marker 10. In the example shown, the trigger 28 is surrounded by a trigger guard 30. A feed neck 32 for supplying projectiles to the breech area 76 (FIG. 3) extends from the receiver 18. Typically, the feed neck 32 connects with a hopper for holding a plurality of projectiles to be fired. One skilled in the art should appreciate that there are other mechanisms for supplying projectiles to the breech area 76, including but not limited to a magazine. The example shown includes an optional rear sight 34 that may aid in aligning the marker 10 with a target.

Figure 2:
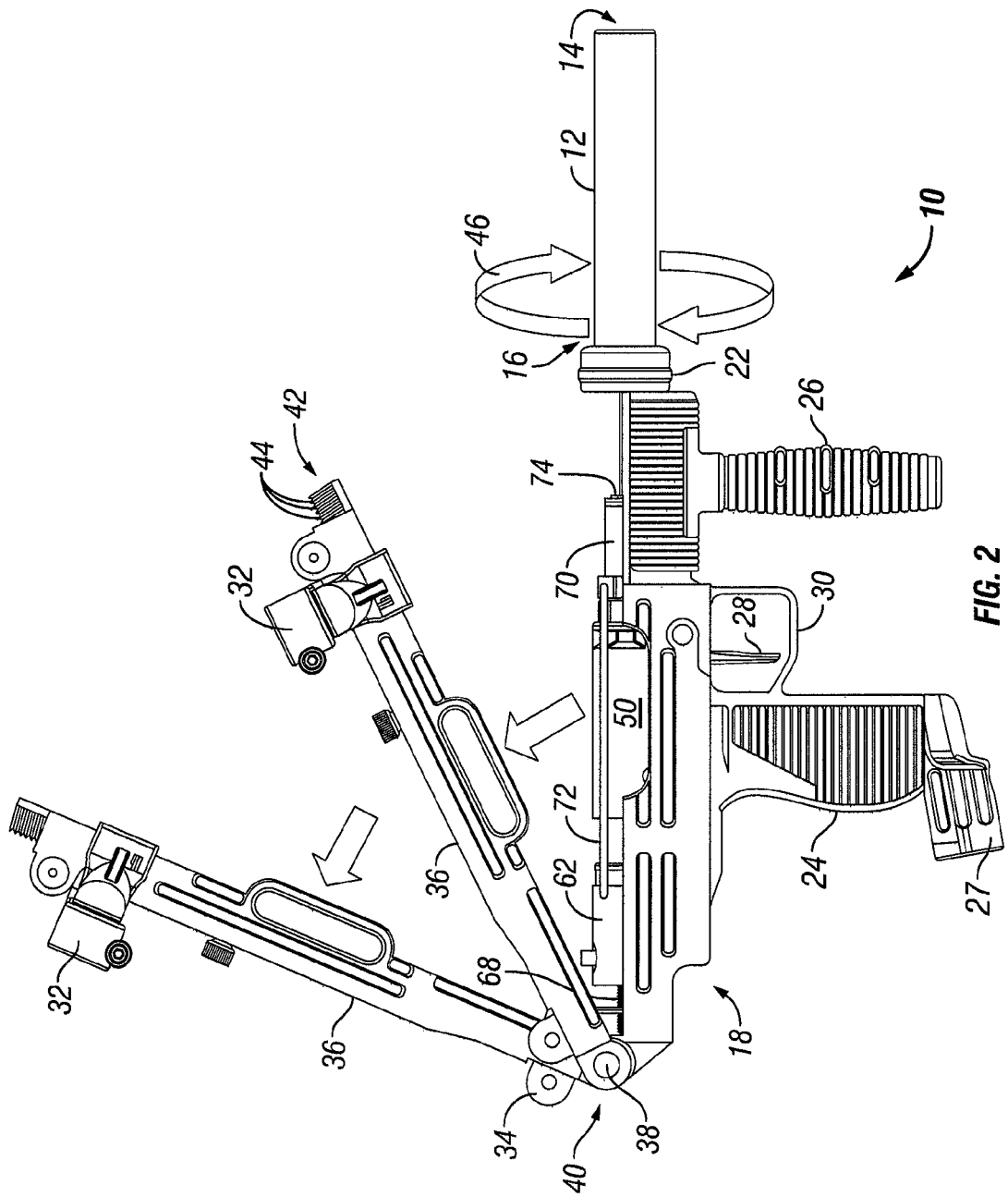
FIG. 2 is the example paintball marker shown in FIG. 1 with a flip top portion of the receiver in an open position.

FIG. 2 shows the example marker 10 with a flip top portion 36 or upper wall of the receiver 18 movable between a closed position and an open position. When the flip top portion 36 is in the open position, this provides an opening through which the user may access internal components of the marker 10, such as the value assembly, for service and maintenance. In the example shown, the flip top portion 36 divides or splits the receiver in an open position to expose the top portion of front bolt 70, the rear bolt 62 and linkage arm 72. This allows these components to be removed by opening the flip top portion and then lifting these components out of the receiver 18. In the example shown, the top portion of the front bolt 70 and rear bolt 62 are exposed along their entire length. If a slip-fit gas line is used with the valve assembly 50, the valve assembly 50 could also be lifted out of the receiver 18. If the valve assembly 50 and bolts 70 and 62 are removed, this provides access to remove the trigger assembly. In this example, the flip top portion 36 forms a longitudinal wall of the receiver 18 that extends substantially the entire length of the receiver 18 (from the rear of the receiver 18 to the barrel 12), but other embodiments are contemplated in which the flip top portion 36 may not necessarily extend the entire length of the receiver 18.

In the example shown, a pivot pin extends laterally from a rear portion of the receiver 18. As shown, a rear portion of the flip top portion 36 defines a hole dimensioned to receive the pivot pin 38. Although this example shows the pivot pin 38 mounted to the rear of the receiver 18, the pivot pin could be mounted in other locations, such as the front of the receiver 18. Thus, the flip top portion 36 of the receiver 18 rotates between the open and closed positions using the pivot pin 38 as a hinge. In this example, the flip top portion 36 rotates about an axis that is approximately perpendicular with a longitudinal axis of the receiver 18. As shown, the flip top portion 36 has a proximal end 40 pivotally attached with the pivot pin 38 and a distal end 42 connectable with the fastener 22. In this example, the distal end 42 includes external threads 44 (FIG. 4) that are configured to mate with internal threads on the fastener 22. When the flip top portion 36 is in the closed position, in the embodiment shown, the fastener 22 is threadably connected with the flip top portion 36 and so the marker 10 can be fired. The user may disconnect the fastener 22 from the flip top portion 36 (by unscrewing in the direction shown by arrow 46 in this example) which releases the flip top portion 36 to rotate about the pivot pin 38. As discussed above, pivoting the flip top portion 36 to the open position provides access to internal components for service and/or maintenance. Other embodiments are contemplated in which the flip top portion 36 could be movable between the open and closed positions in ways other than rotation. By way of example, the flip top portion 36 could be slidable with respect to the receiver 18 for moving between the open and closed positions. By way of another example, the flip top portion 36 could be entirely disconnected and removed from the receiver 18 for access to internal components. The term "flip top" is not intended to require a pivotal connection, but should be broadly construed to include any type of movement that opens the receiver 18 so internal components can be accessed, whether this movement is pivotal or not.

Figure 3:
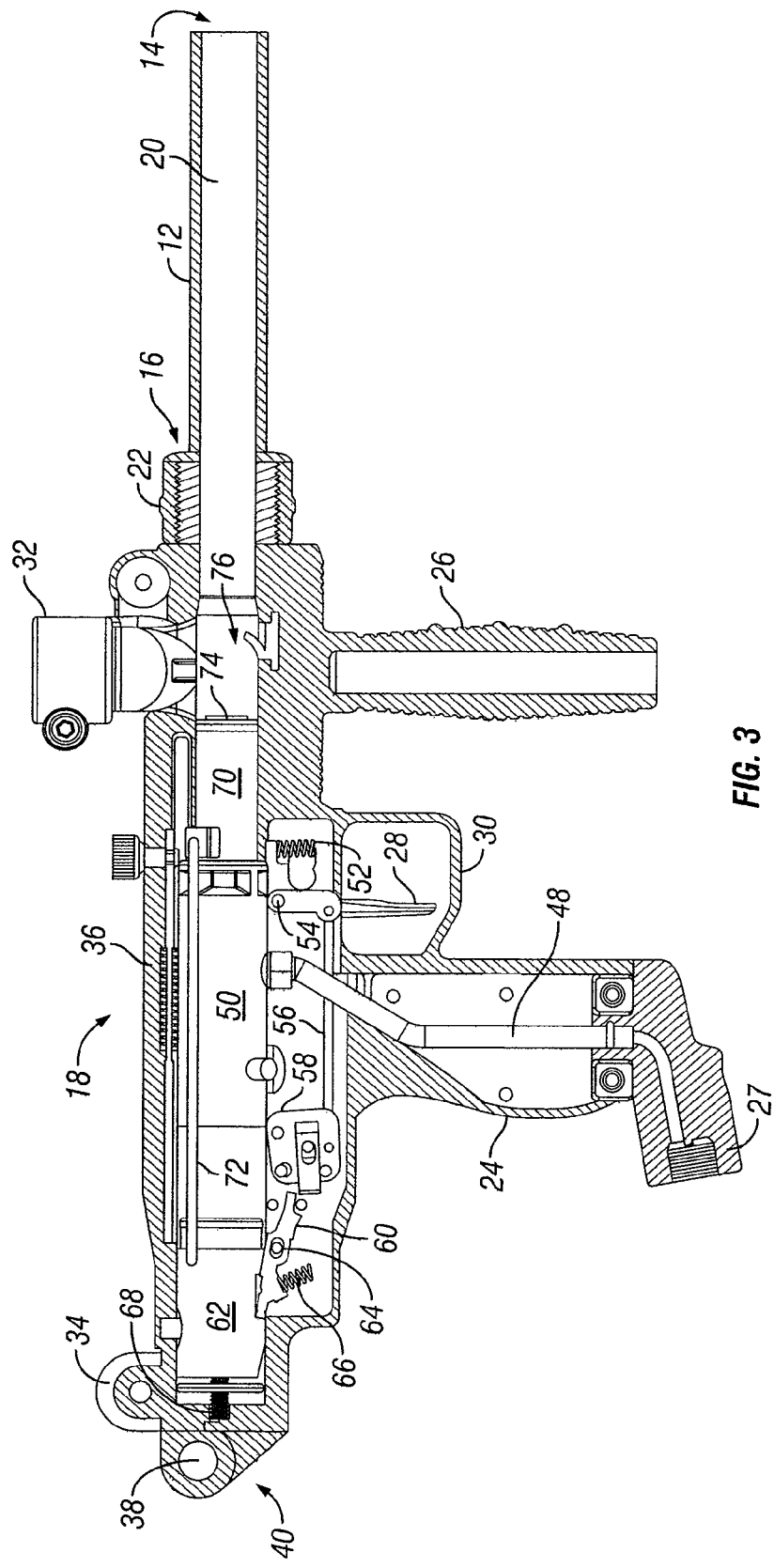
FIG. 3 is a side view of the example paintball marker shown in FIG. 1 with the receiver in cross-section to show internal components.

Referring to FIG. 3, a portion of the receiver 18 has been removed to expose some of the internal components. As shown, a conduit 48 extends from the tank adapter 27 to provide fluid communication between a supply of compressed gas (not shown), such as carbon dioxide or nitrogen, and a valve assembly 50. As previously discussed, the present invention may also be implemented in a combustible gas marker. The compressed gas marker shown herein is provided for example purposes only, but does not limit the type of marker in which the present invention could be implemented.

An example trigger assembly is shown in FIG. 3. In the example shown, the trigger 28 may move under the bias of a spring 52 and pivots about pivot pin 54. A linkage 56 is pivotably connected to the trigger 28 to actuate a sear actuation assembly 58. A sear 60 is interposed between the sear actuation assembly 58 and a rear bolt 62. In this example, the sear 60 is disposed on pivot pin 64 and is biased by spring 66 toward engagement of the rear bolt 62.

In the example shown, the rear bolt 62 moves under the bias of a drive spring 68 upon actuation of the trigger 28. When the trigger 28 is actuated, in this example, this releases the rear bolt 62 from the sear 60. As shown, the rear bolt 62 is connected to a front bolt 70 via a linkage arm 72. This causes concomitant movement of the front bolt 70 with the movement of the rear bolt 62 in this example. Embodiments are contemplated in which the front bolt 70 and rear bolt 62 do not move in a concomitant manner, such as shown in U.S. Pat. No. 7,770,571 for an anti jam mechanism, which is hereby incorporated by reference in its entirety. The front bolt 70 includes a projectile engagement end 74 adjacent to the breech area 76 of the marker 10. The projectile engagement end 74 of the front bolt 70 is adapted to push a projectile (not shown) from the breech area 76 into the breech end 16 of the barrel 12. During each cycle of the marker 10, another projectile is typically loaded into the breech area 76 through the feed neck 32. In other examples, the marker 10 may include an integral magazine for feeding the projectiles into the breech area 76. In this example, the bias of drive spring 68 on rear bolt 62 causes rear bolt 62 to depress an impact pin on the valve assembly 50, which causes the valve assembly 50 to release a quantity of compressed gas. For example, the valve assembly 50 may be configured to release a portion of compressed gas into the breech area 76, thereby causing a projectile to be propelled out muzzle end 14 of the barrel 12. In the case of a semi-automatic marker, another quantity of compressed gas may be released on the side of valve assembly 50 in which the rear bolt 62 is disposed, which will recoil the rear bolt 62 to the cocked position. It should be appreciated that other trigger assemblies, both mechanical and electrical, may be suitable to selectively fire the marker and are contemplated herein. Likewise, one skilled in the art should appreciate that various valve assemblies, both mechanical and electrical, may be suitable for the marker 10.

Figure 4:
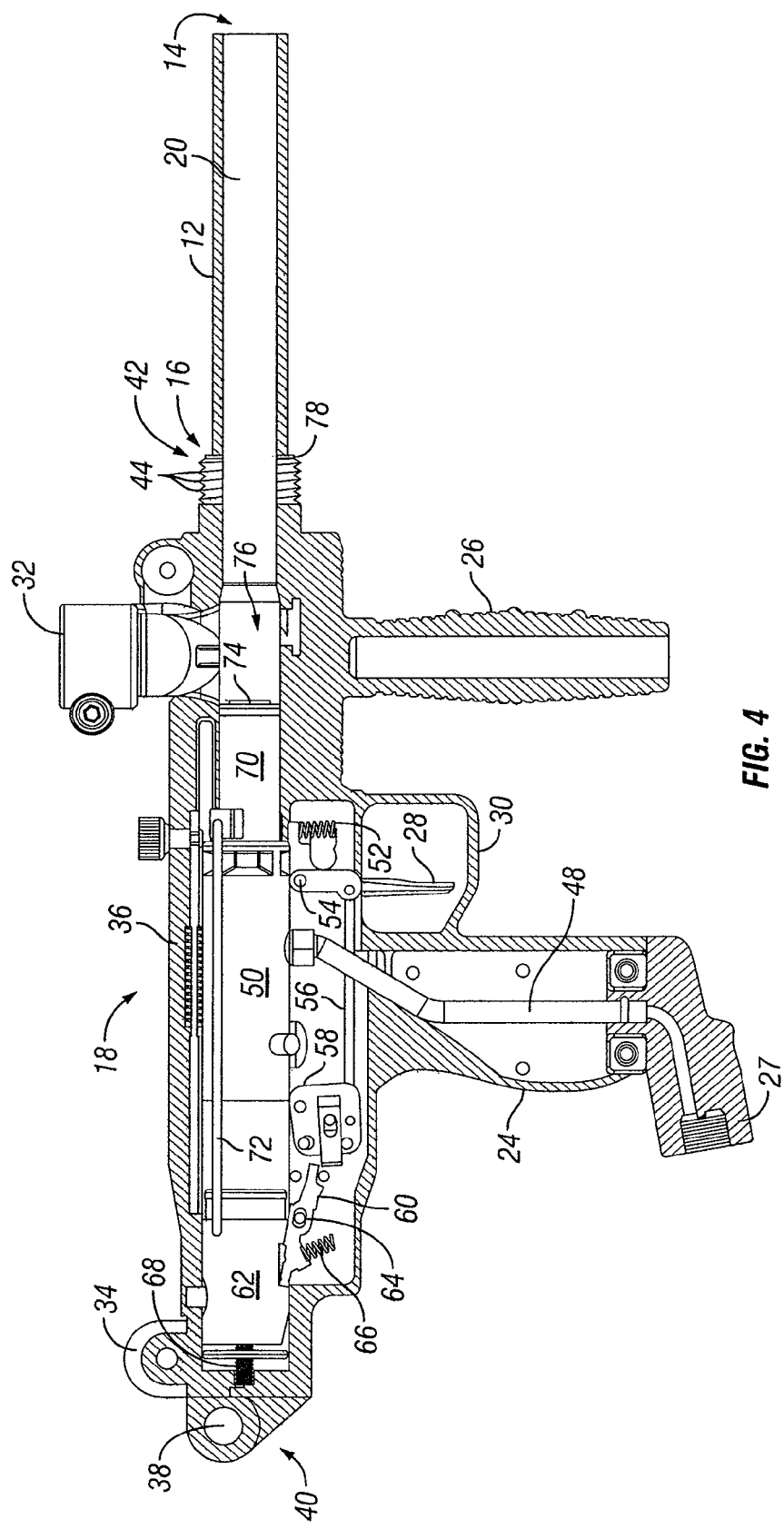
FIG. 4 is the example paintball marker shown in FIG. 3 with the receiver fastener removed.
Figure 5:
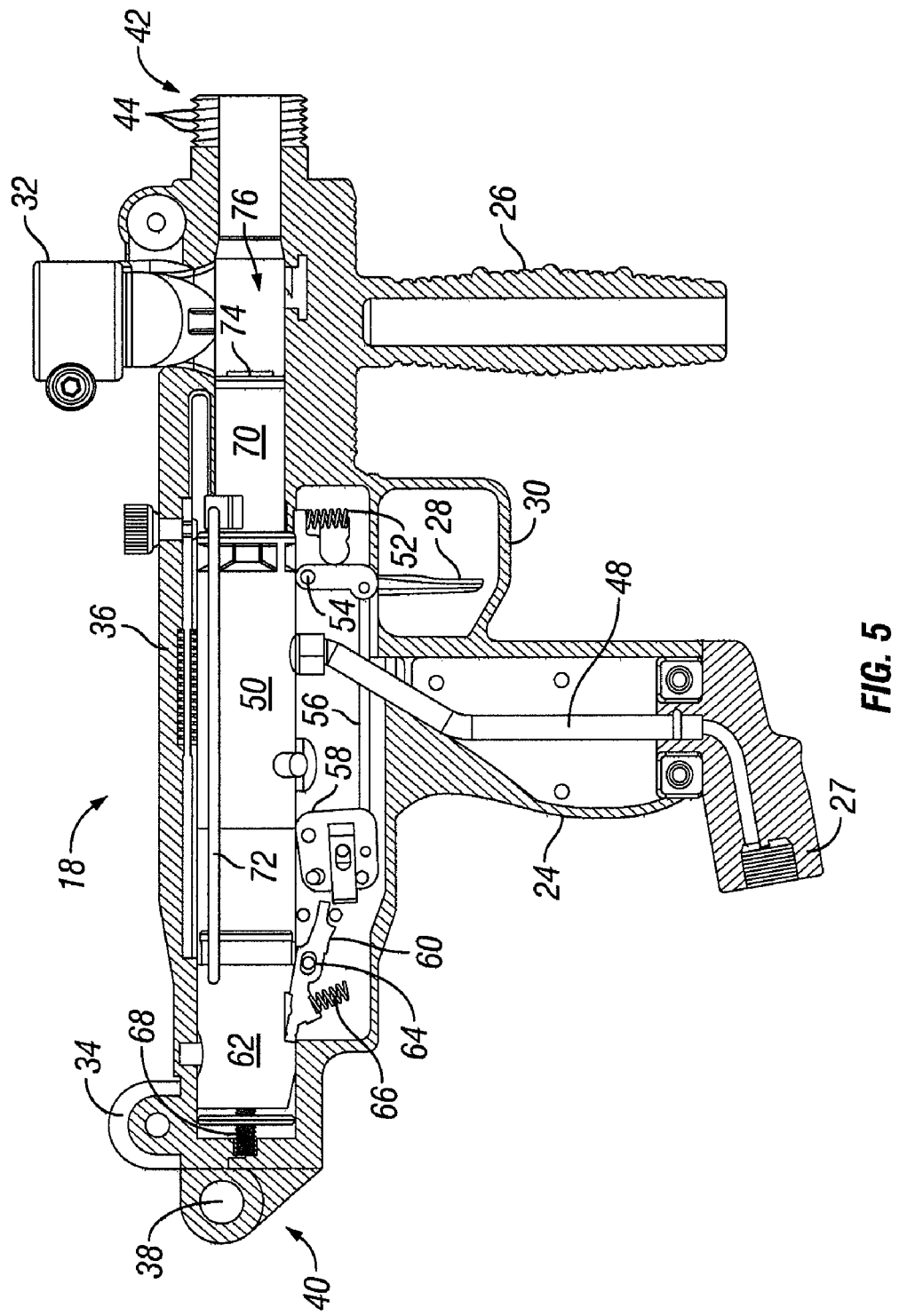
FIG. 5 is the side view of the example paintball marker shown in FIG. 4 with the barrel removed.
Figure 17:
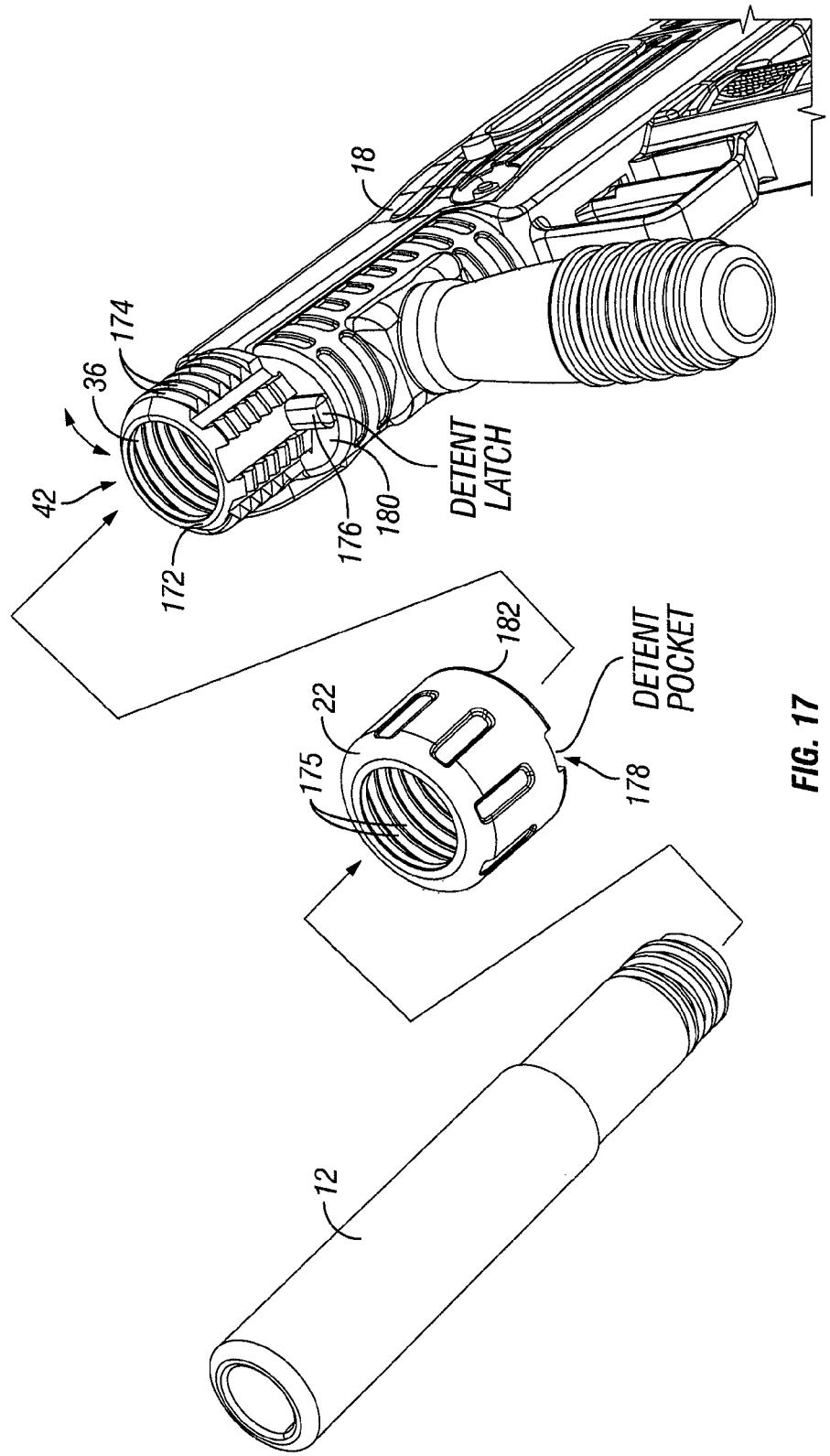
FIG. 17 is a partial exploded view of an example paintball marker with a locking barrel according to an embodiment of the present invention.

FIG. 4 is the same as FIG. 3, except that the fastener 22 has been removed, which releases the flip top portion 36 from the receiver 18. As discussed above, this allows the flip top portion 36 to move (pivot about pivot pin 38 in this example) between an open position that allows access to internal components for service/maintenance and a closed position that allows the marker 10 to be fired. In the example shown, the barrel 12 includes a snap ring 78, which acts as a flange, attached to the breech end 16, which connects the barrel 12 to the receiver 18 when the fastener 22 is connected to the receiver 18. Accordingly, in the embodiment shown, removal of the fastener 22 also allows removal of the barrel 12 from the receiver 18 for servicing. FIG. 5 shows the marker 10 with the barrel 12 removed. Embodiments are also contemplated in which the barrel 12 could be independently removed without needing to remove the fastener 22. For example, FIG. 17 shows an embodiment in which the barrel 12 includes external threads that mate with internal threads of the receiver 18. In such an embodiment, the barrel 12 could be disconnected from the receiver 18 by unscrewing the barrel 12 without regard to whether or not the fastener 22 is removed.

Figure 6:
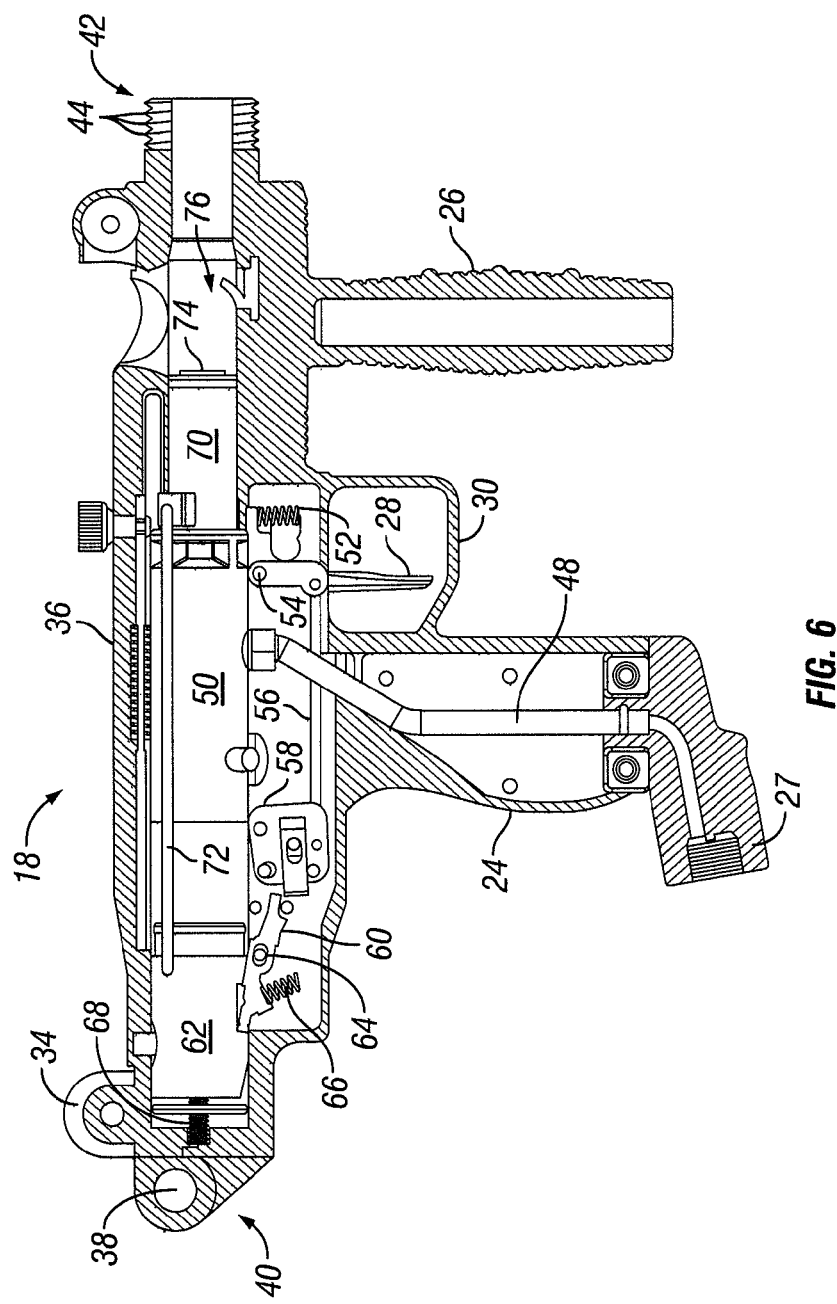
FIG. 6 is the side view of the example paintball marker shown in FIG. 5 with the feed neck removed.
Figure 7:
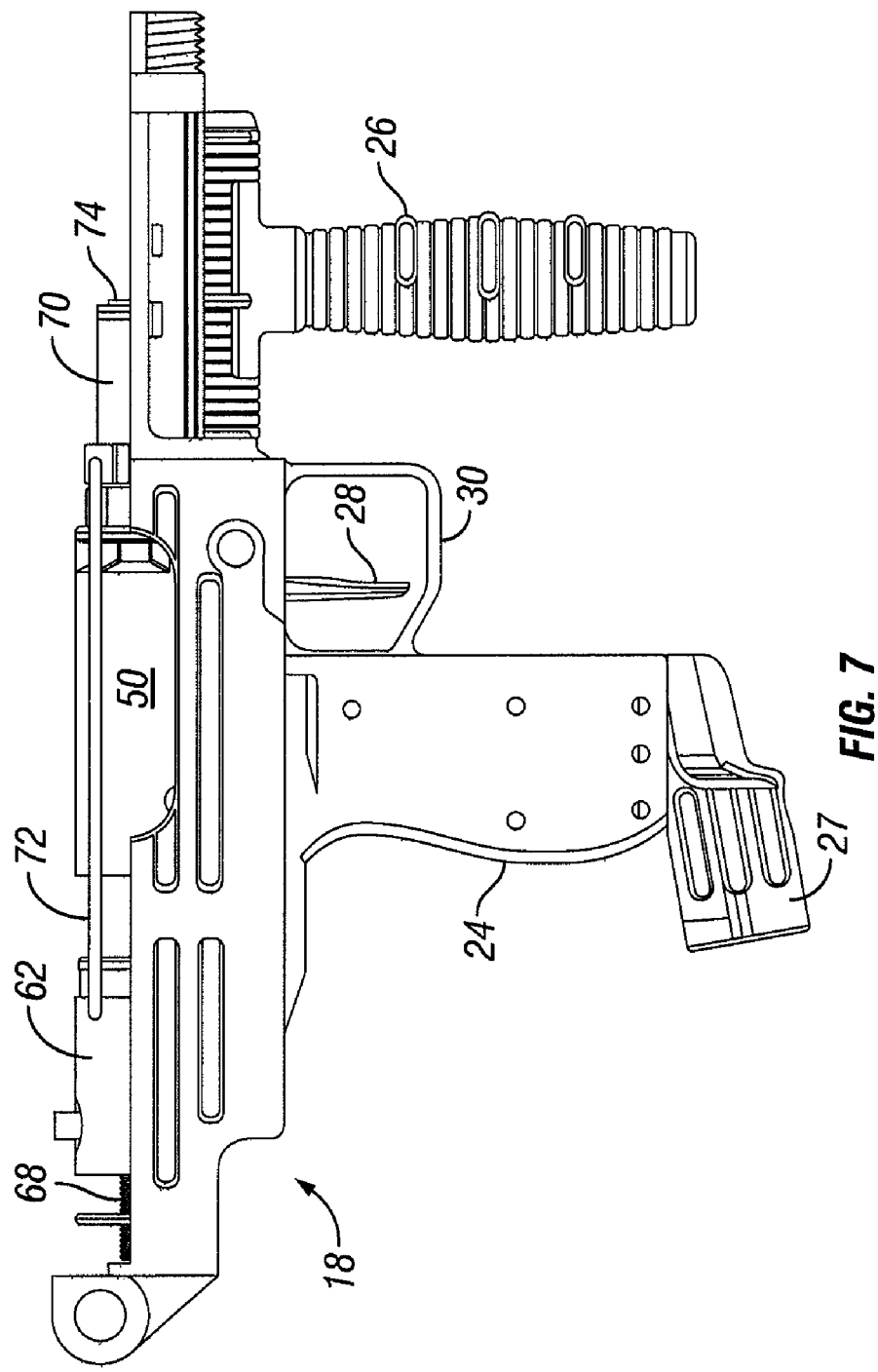
FIG. 7 is the side view of the example paintball marker shown in FIG. 6 with the flip top portion of the receiver removed.
Figure 8:
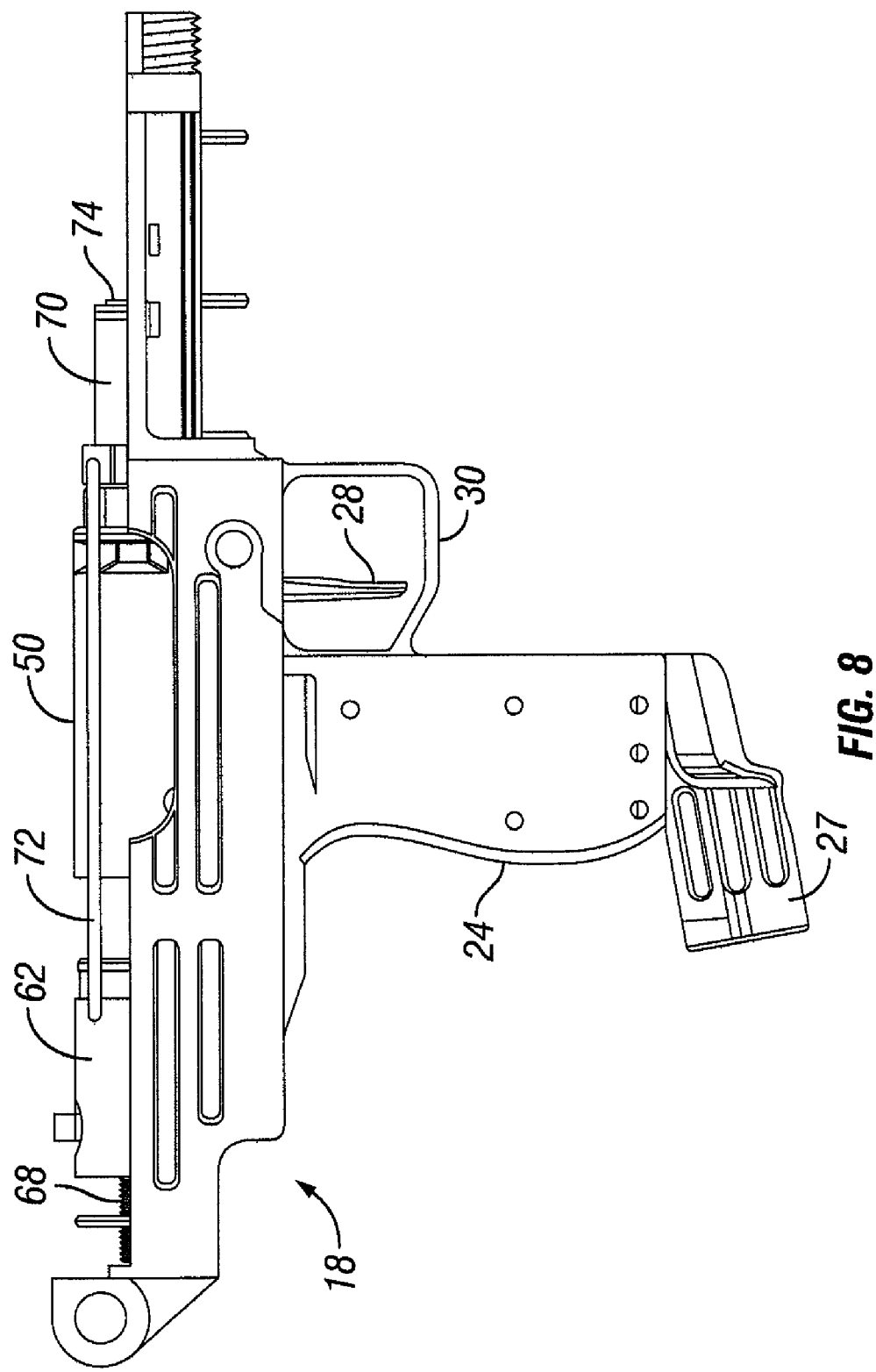
FIG. 8 is the side cross-sectional view of the example paintball marker shown in FIG. 7 with the vertical grip removed.
Figure 9:
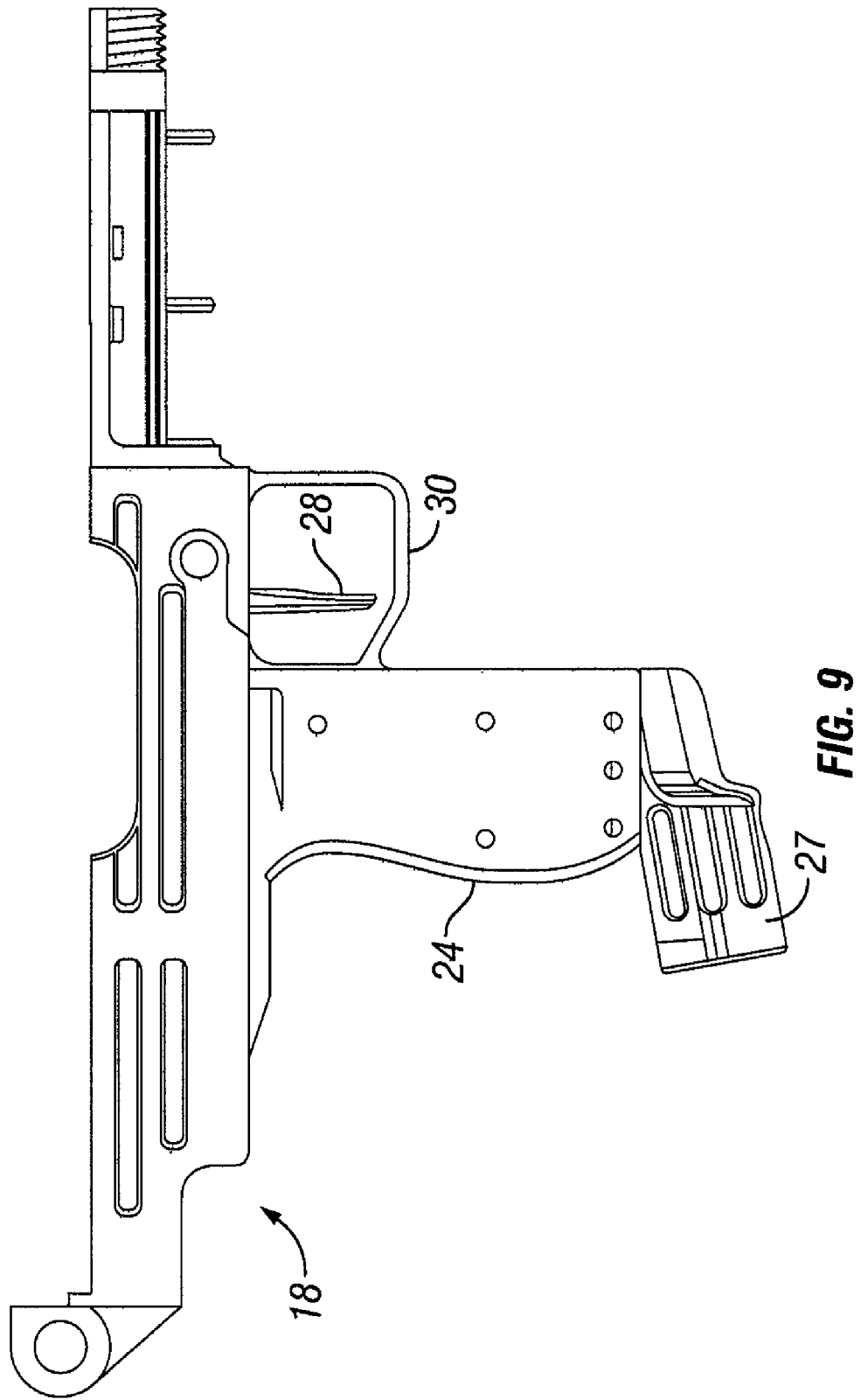
FIG. 9 is the side view of the example paintball marker shown in FIG. 8 with the front bolt, rear bolt, and valve assembly removed.
Figure 10:
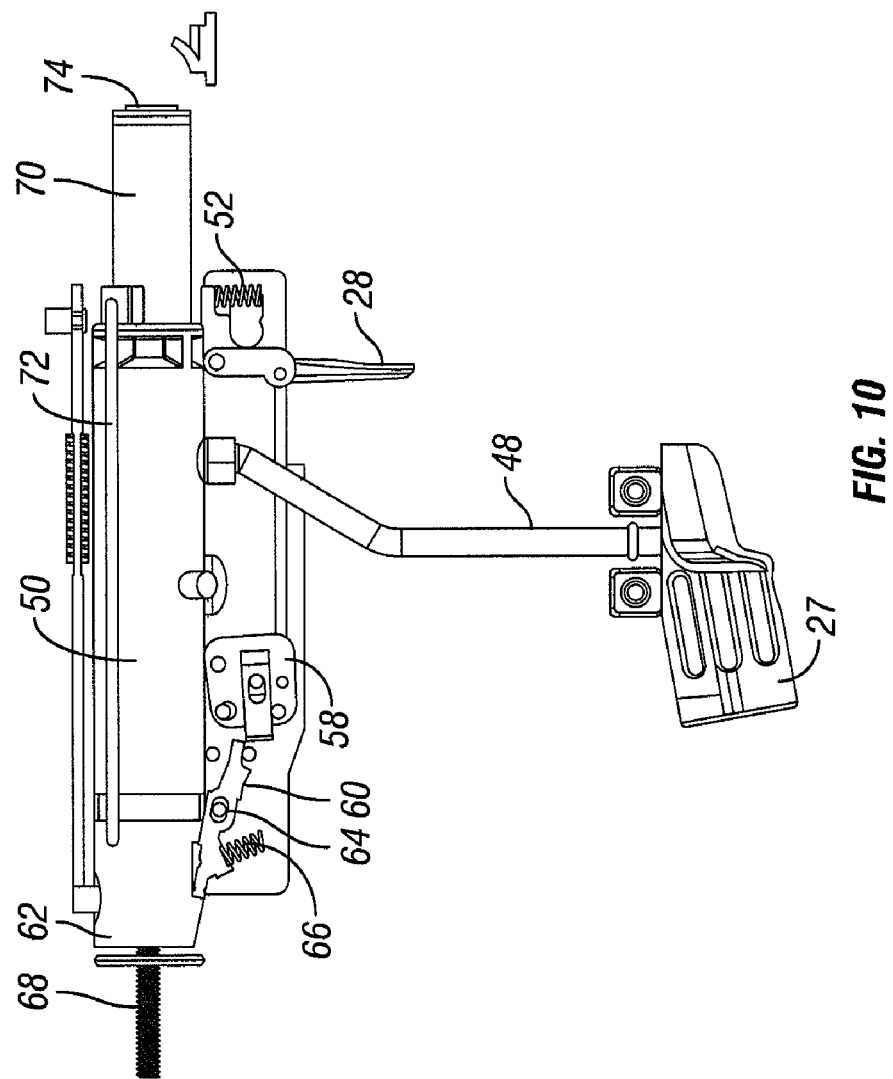
FIG. 10 is a side view of various internal components of the example paintball marker shown in FIG. 1.

FIGS. 6-10 show a series of views of the marker 10 being disassembled, such as for service and/or maintenance. In FIG. 6, the feed neck 32 has been removed. The flip top portion 36 of the receiver 18 has been removed in FIG. 7. In FIG. 8, the vertical grip 26 has been removed. FIG. 9 shows the receiver 18 without the flip top portion 36 and without the valve assembly 50. FIG. 10 shows the valve assembly 50 and various components of the example trigger assembly.

Operation of the marker 10 to provide access to internal components for service and/or maintenance will now be explained. In the embodiment shown, the user would disconnect the fastener 22 from the receiver 18 by unscrewing and removing the fastener 22 from the marker 10. This releases the flip top portion 36 of the receiver 18 so the user may pivot the flip top portion 36 upwardly about pivot pin 38 to gain access to internal components of the marker 10. When the user has finished maintenance/service of the marker 10, the flip top portion 36 may be closed by pivoting the flip top portion 36 downward and connecting the fastener 22 to secure the flip top portion 36. The marker 10 is now ready for firing.

FIGS. 11-14 show an embodiment with a latch assembly 100 configured to unlock/lock the feed neck 32 to the receiver 18, such as for maintenance or replacement. In the embodiment shown, a hopper (not shown) that may be attached to the feed neck 32 would not need to be disconnected to remove the feed neck 32. Instead, the feed neck 32 could be released from the receiver 18 while still being connected to the hopper.

Figure 11:
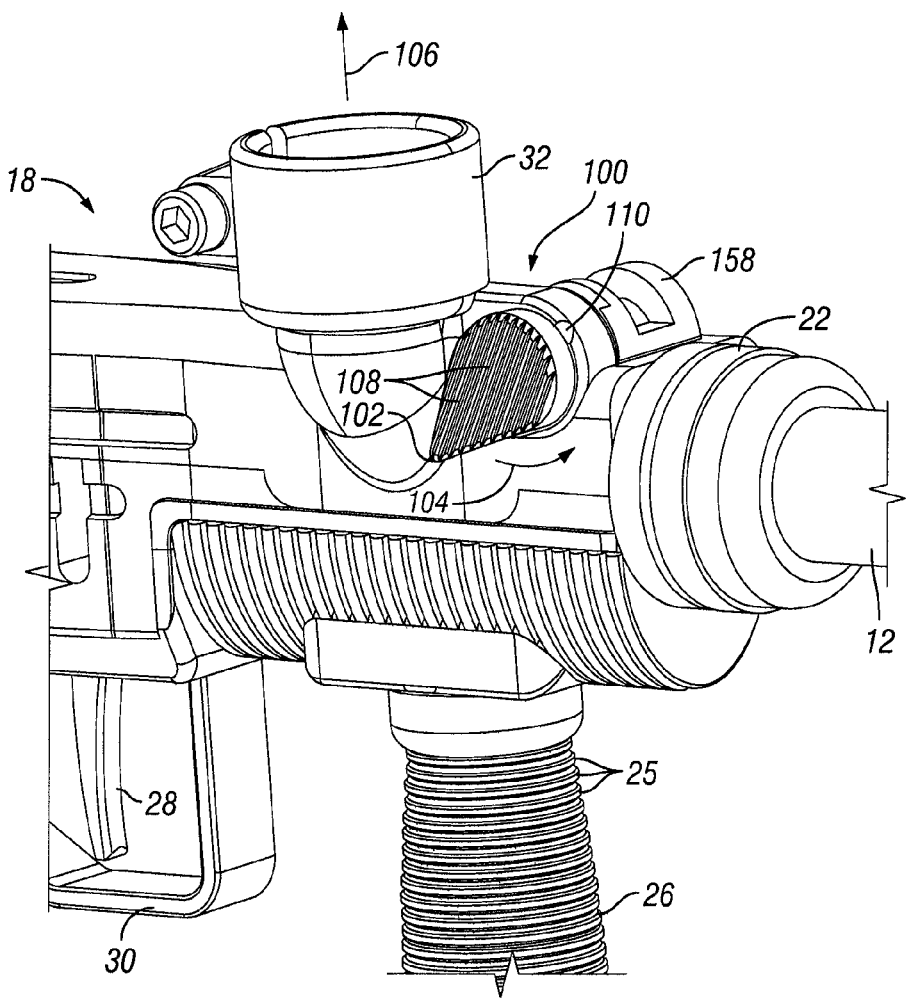
FIG. 11 is a partial side view of a paintball marker with an embodiment having a quick release feed neck and vertical grip.

In the embodiment shown in FIG. 11, the latch assembly 100 includes a lever 102 that locks and unlocks the latch assembly 100. In the position shown in FIG. 11, the lever 102 is in a locked position that prevents the feed neck 32 from being removed from the receiver 18. When the lever 102 is moved to an unlocked position, such as by rotating the lever 102 in the direction of arrow 104, the feed neck 32 is unlocked and may be released from the receiver 18 by moving the feed neck 32 in the direction of arrow 106. Although the lever 102 rotates to between locked/unlocked positions in the embodiment shown in FIG. 11, one skilled in the art should appreciate that the lever could move linearly between locked/unlocked positions. Moreover, one skilled in the art should appreciated that the lever 102 could be configured to be unlocked when moved in a clock-wise direction, even though FIG. 11 shows the lever 102 rotating in a counter-clockwise movement to unlock the latch assembly 100.

FIG. 11 shows an embodiment of the lever 102 with a tear drop shape. However, one skilled in the art should appreciate that the lever 102 could have a variety of suitable shapes, including but not limited to an oval, circle, triangle, rectangle, or other polygonal shape. In the embodiment shown, the lever 102 includes optional exterior surface ornamentation 108, such as a knurled surface, to make the lever 102 easier to grip or operate.

Also visible in the embodiment shown in FIG. 11 is a notch that is dimensioned to receive a detent 112 (FIG. 12) on an interior surface of the lever 102. For example, the lever 102 may include detents 112 corresponding to the unlocked position and the locked position. The notch 110 and detents 112 act to fix the position of the lever 102 in either the locked/unlocked position. This also aids the user in providing positive tactile feedback to know when the lever is in either the locked/unlocked position.

Figure 12:
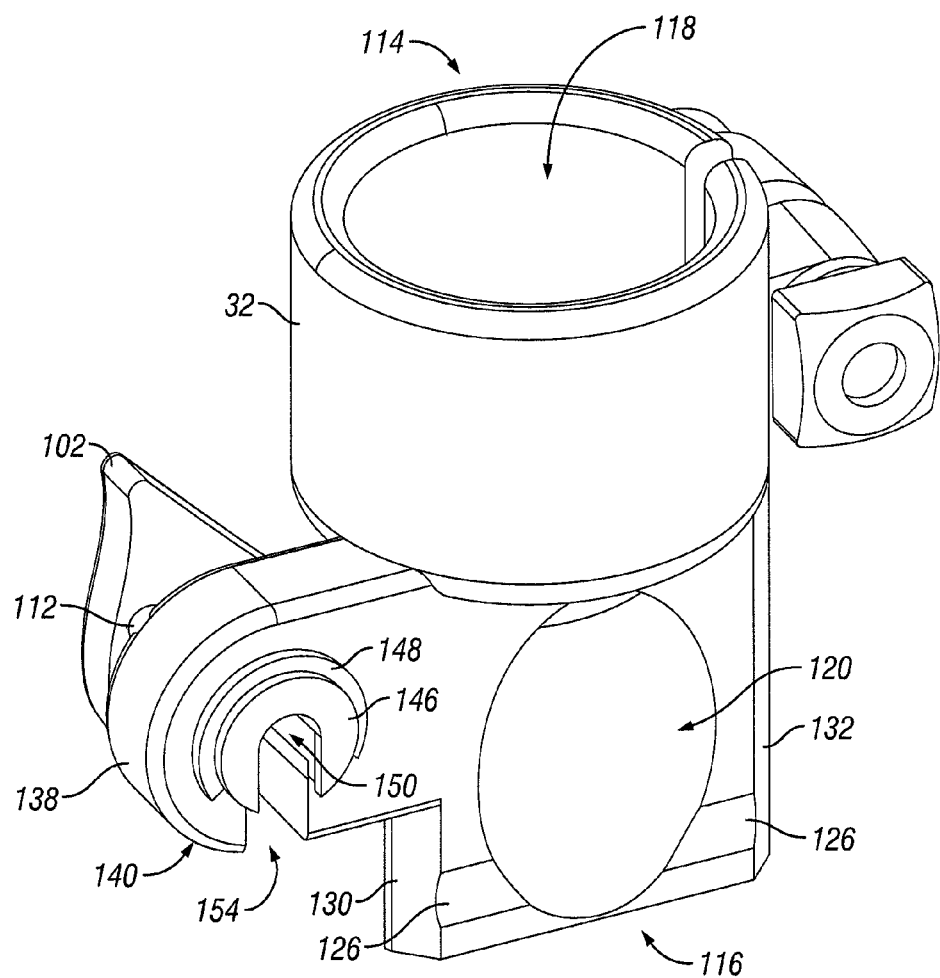
FIG. 12 is a perspective view of an example feed neck with a latch assembly in an unlocked position according to an embodiment of the present invention.
Figure 13:
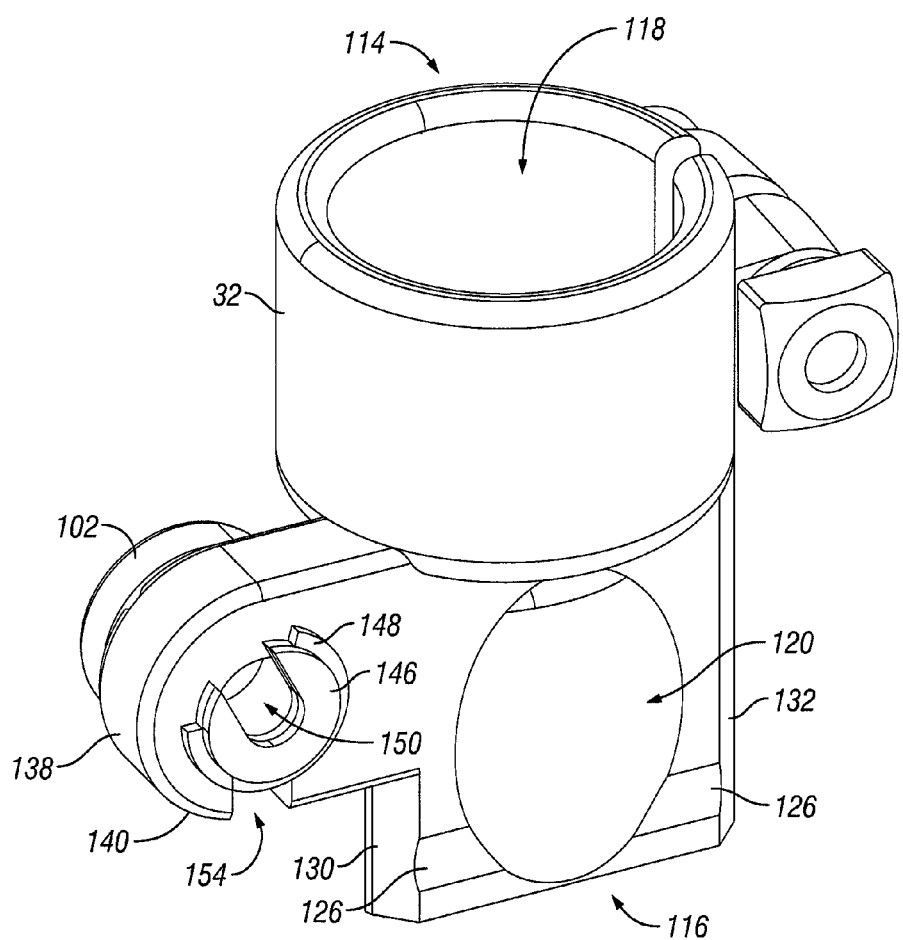
FIG. 13 is a perspective view of the example feed neck shown in FIG. 12 with the latch assembly in the locked position.
Figure 14:
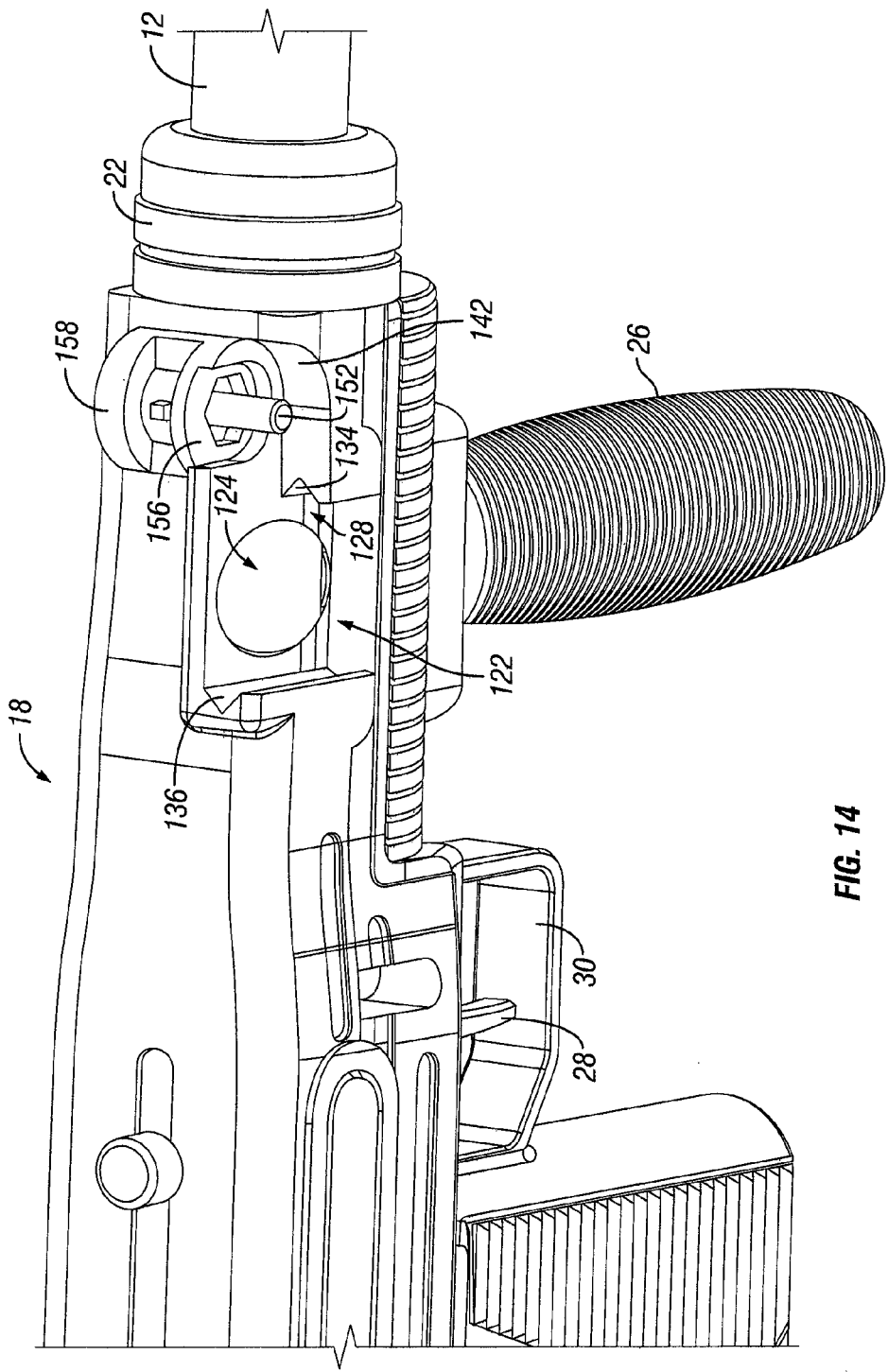
FIG. 14 is a partial perspective view of the paintball marker shown in FIG. 11 with the feed neck removed.

FIGS. 12 and 13 show the feed neck 32 with the latch assembly in the unlocked and locked positions, respectively. In the example shown, the feed neck 32 has a top end 114 and a bottom end 116. The top end 114 has an opening 118 that typically would be connected to a hopper (not shown). The paintballs (or other projectiles) enter the feed neck 32 from the hopper through the opening 118. The paintballs move through an internal bore in the feed neck 32 and exit through a discharge opening 120 into the breech area 122 (FIG. 14) for firing. The discharge opening 120 aligns with an opening 124 in the breech area 122 to supply paintballs into the breech area 122 (FIG. 14). In the embodiment shown, the internal face of the feed neck 32 includes a relieved portion 126 that aligns with a slot 128 in a wall of the breech area 122 (FIG. 14).

In the embodiment shown, the feed neck 32 includes a first V-shaped wall 130 and a second V-shaped wall 132 that are configured to be received by a first V-shaped slot 134 and a second V-shaped slot 136 in the receiver 18. When the feed neck 32 is inserted into the receiver 18 (via an opposite direction of arrow 106), the V-shaped walls 130, 132 in the feed neck 32 are received by the V-shaped slots 134, 136 in the receiver 18, which reduces lateral movement of the feed neck 32. Although the embodiment shown includes V-shaped walls and slots, one skilled in the art should appreciate that other shapes could be used to provide a relatively tight fit between the receiver and feed neck and reduce lateral movement.

In the embodiment shown, the latch assembly 100 includes a shoulder 138 that extends from the first V-shaped wall 130. As shown, the shoulder 138 includes an arcuate portion 140 that is configured to be received by a corresponding arcuate wall 142 on the receiver 18. In the embodiment shown, a latch 146 extends through an opening in the shoulder 38. As shown, the latch 146 is connected with the shoulder 138 using a snap ring 148. One skilled in the art should appreciate, however, that other fasteners could be used to connect the latch 146 with the shoulder 138. The latch 146 is operatively connected with the lever 102 such that rotation of the lever 102 causes rotation of the latch 146. For example, the lever 102 could be connected with the latch 146 using adhesive, an interference fit, a frictional fit or a unitary formation.

As shown, the latch 146 includes a longitudinally-extending groove 150 dimensioned to receive a pin 152 extending from the receiver 18. In this embodiment, the bottom end 116 of the shoulder 138 includes a slot 154 that may be aligned with the groove 150 in the latch 146 when the lever 102 is in the unlocked position, such as shown in FIG. 12. When the feed neck 32 is inserted into the receiver 18, the lever 102 is in the unlocked position. In the unlocked position, the pin 152 passes through the slot 154 to be received in the groove 150. As shown, the portion of the latch 146 and snap ring 148 extending from the shoulder 138 are received by a recessed area 156 on the receiver 18. In this example, the recessed area 156 is part of an aiming device 158 formed on the top of the receiver 18. When the lever 102 is moved to the locked position, such as shown in FIG. 13, the groove 150 is no longer aligned with the slot 154, which creates an interference fit between the pin 152 and the latch 146, which prevents the feed neck 32 from being removed from the receiver 18. When the user wants to remove the feed neck 32 from the receiver 18, such as for maintenance or replacement, the lever 102 is moved to the unlocked position. In this position, the groove 150 is aligned with the slot 154, which allows the pin 152 to pass through the slot 154.

Figure 15:
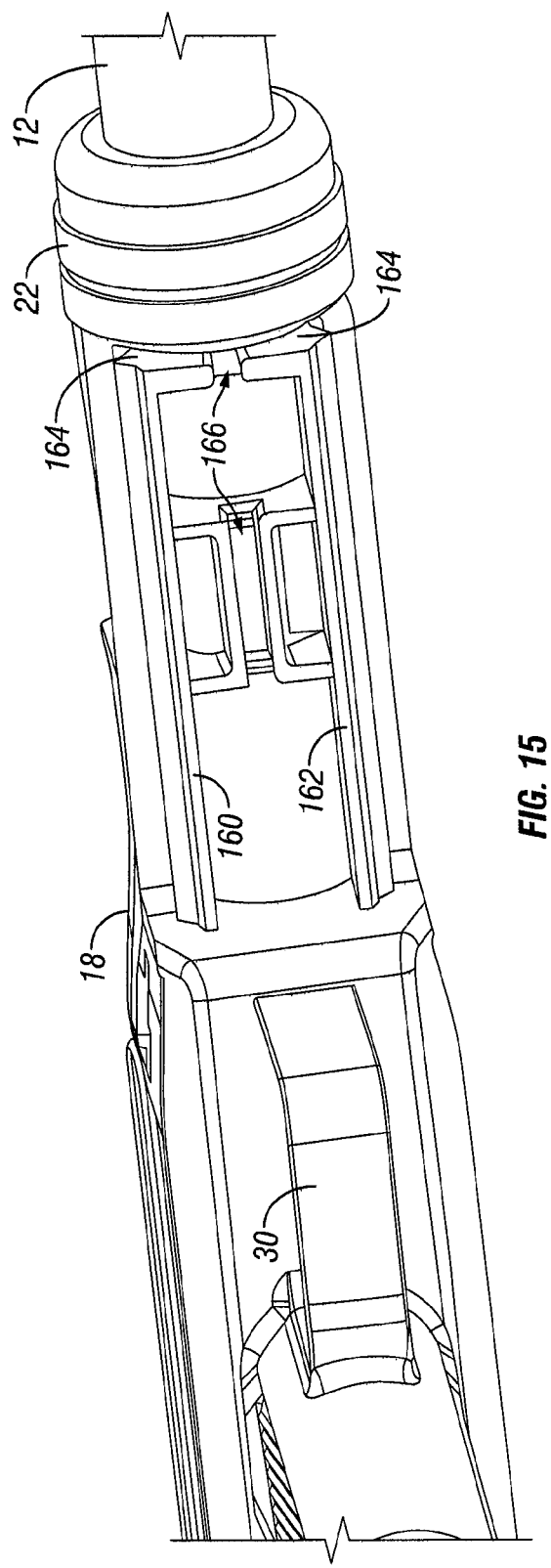
FIG. 15 is a bottom partial view of an example receiver configured with a quick connection for the vertical grip.
Figure 16:
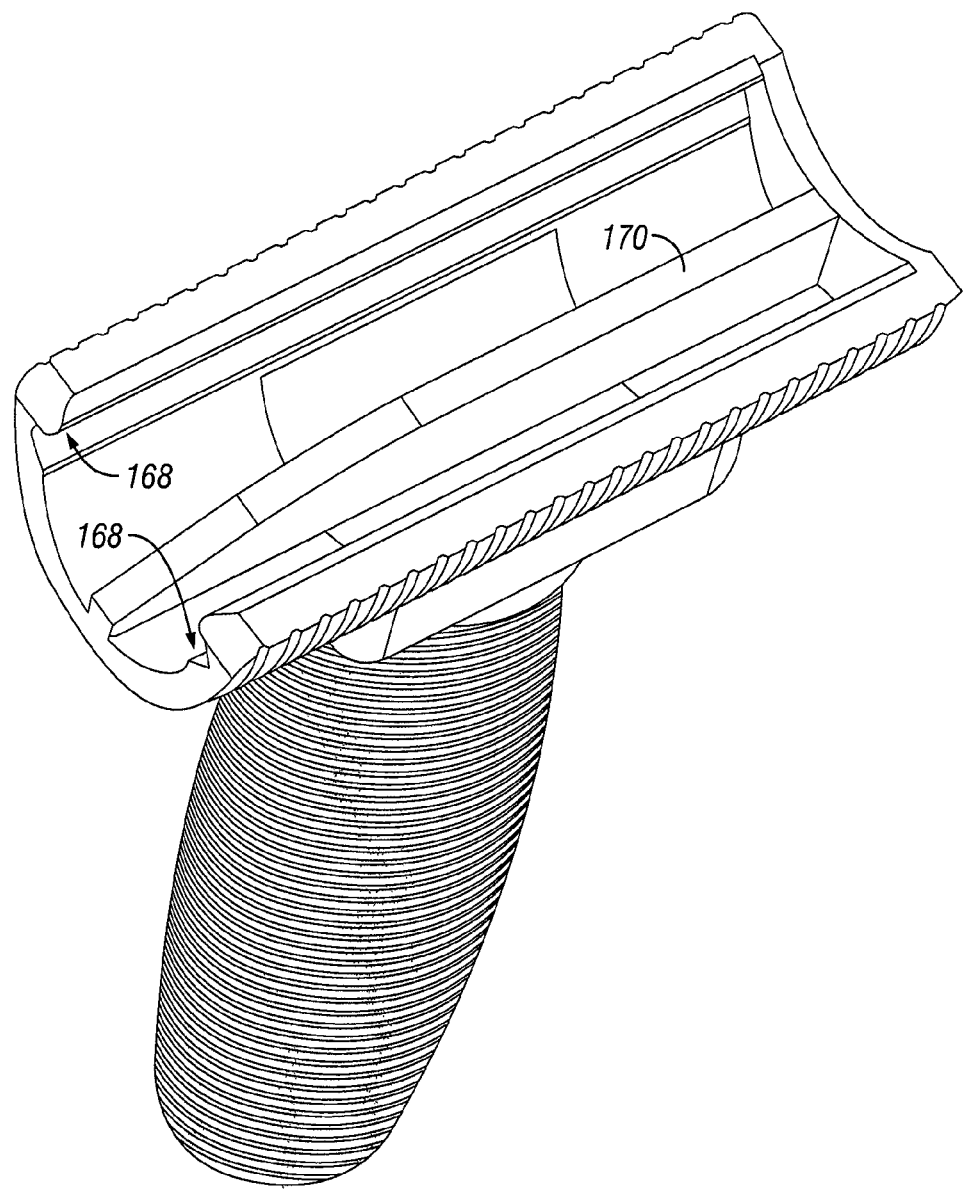
FIG. 16 is a perspective view of an example vertical grip configured to be connected with the quick connection on the example receiver shown in FIG. 15.

FIGS. 15 and 16 show an embodiment in which the vertical grip 26 may be quickly removed, such as to provide access to the paintball latch system. In this example, the bottom of the receiver 18 includes a first rail 160 and a second rail 162. The rails 160, 162 include outwardly extending ridges 164 as shown. A central slot 166 is provided between the rails 160, 162. In the embodiment shown in FIG. 16, the top end of the vertical grip 26 includes inwardly extending slots 168 configured to receive the ridges 164 in the receiver 18. A central rail 170 is provided in the vertical grip that is configured to be received by the central slot in the receiver 18. In this embodiment, the vertical grip 26 may be slid into place and locked.

Figure 18:
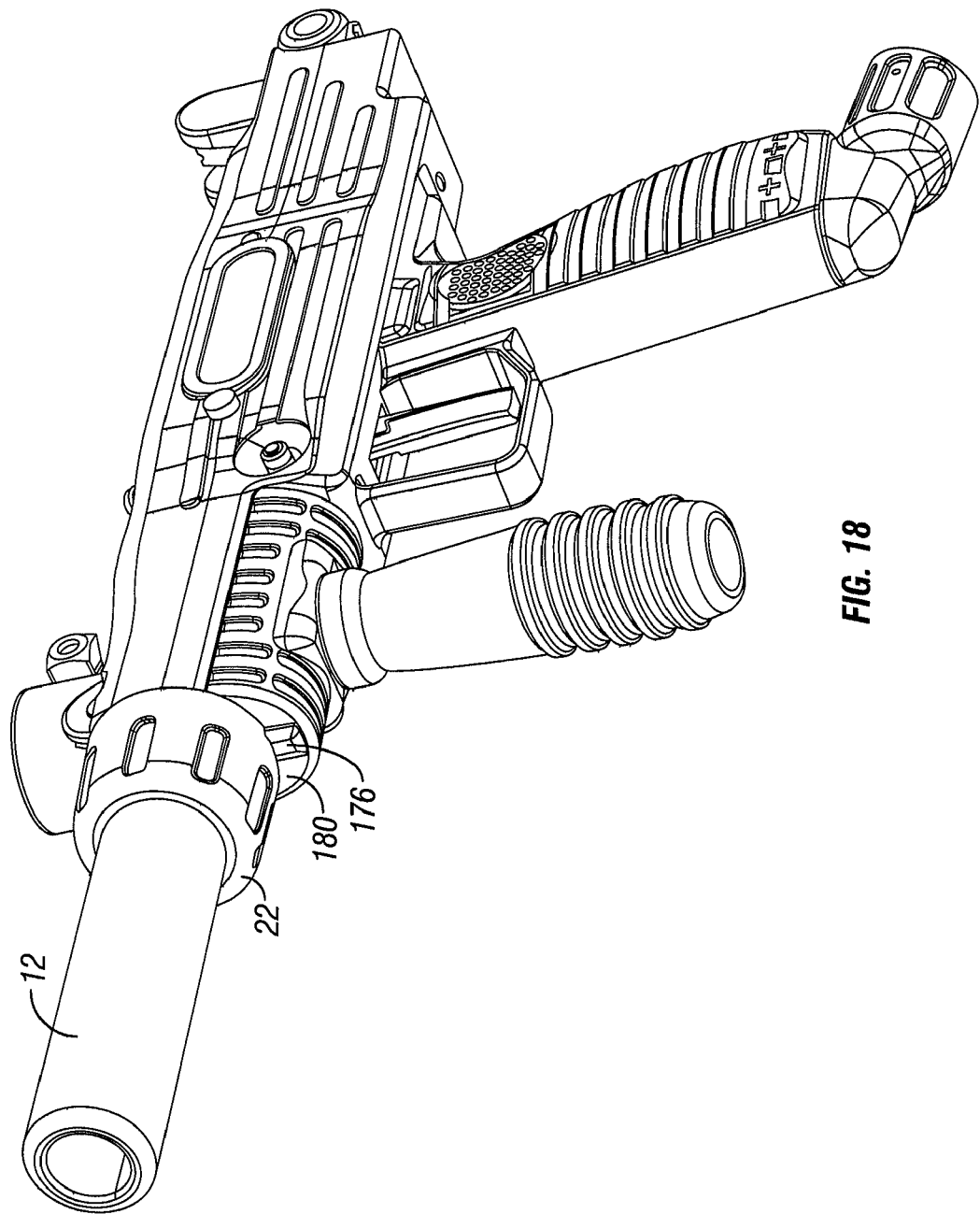
FIG. 18 is a left side perspective view of a paintball marker with the locking barrel shown in FIG. 17.
Figure 19:
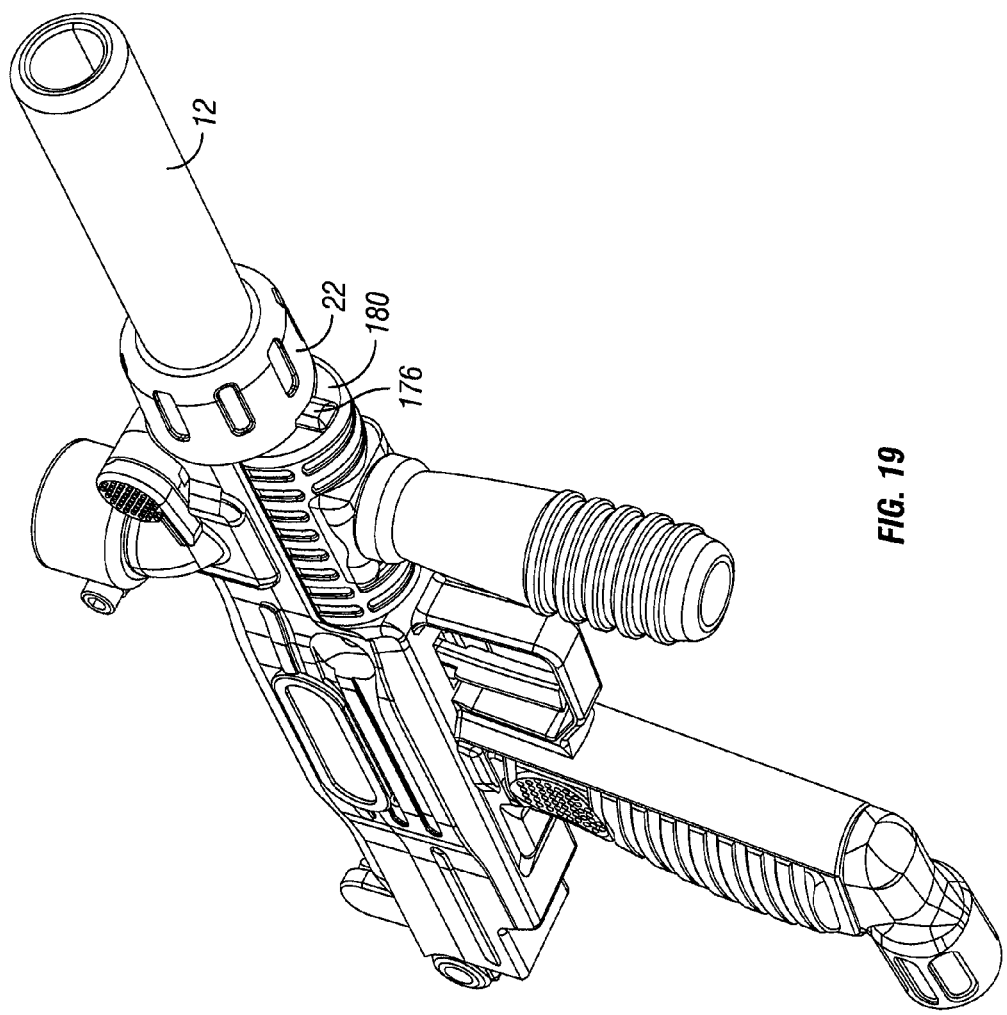
FIG. 19 is a right side perspective view of a paintball marker with the locking barrel shown in FIG. 17.

FIGS. 17-19 show an embodiment with a locking receiver arrangement. As discussed above, a flip top portion 36 of the receiver 18 may be movable between an open and closed position. In this example, the flip top portion 36 of the receiver 18 is locked together with a lower portion 172 of the receiver 18 using a fastener 22, which is a nut in the embodiment shown. In the example shown, the distal end 42 of the flip top portion 36 and the lower portion 172 include external threads 174 configured to threadably mate with internal threads 175 of the fastener 22. In this example, the distal end 42 of the receiver 18 includes a detent latch 176 that is dimensioned to be received in a detent pocket 178 formed on the fastener 22. For example, embodiments are contemplated in which the detent latch 176 may be movable between an extended position (as shown in FIGS. 17-19) in which the detent latch 176 is received in the detent pocket 178 and a retracted position in which the detent latch 176 is flush with a transverse surface 180 on the distal end 42 of the receiver 18. With this example arrangement, when the detent latch 176 is in the extended position, the detent latch 176 forms an interference fit with the detent pocket 178 to block rotation of the fastener 22 with respect to the receiver 18, thereby locking the fastener 22 in place. This locking feature prevents accidental removal by the user. In some cases, the detent latch 176 may be spring-loaded to urge the detent latch 176 to the extended position.

This arrangement allows a user to easily remove the fastener 22 by hand without needing any tools, but remain locked to prevent accidental removal by the user. The user may attach the fastener 22 to the distal end 42 of the receiver 18, in the embodiment shown, by screwing the fastener 22 onto the receiver 18 using the threads 175 with respect to the threads 174. As the fastener 22 is screwed onto the receiver 18, a rear edge 182 of the fastener 22 will depress the detent latch 176 to the retracted position until the point when the detent pocket 178 aligns with the detent latch 176. When this alignment happens, the detent latch 176 will be urged into the detent pocket 178, thereby self-locking the fastener 22 into place. When the user would like to remove the fastener 22, the user may depress the detent latch 176 to move the detent latch 176 to the retracted position. When in the retracted position, the detent latch 176 is flush with the transverse surface 180 on the receiver 18 and is therefore unlocked. The fastener 22 may then be unscrewed from the receiver 18. This releases the flip top portion 36 of the receiver 18 for quick access to internal components.

Figure 20:
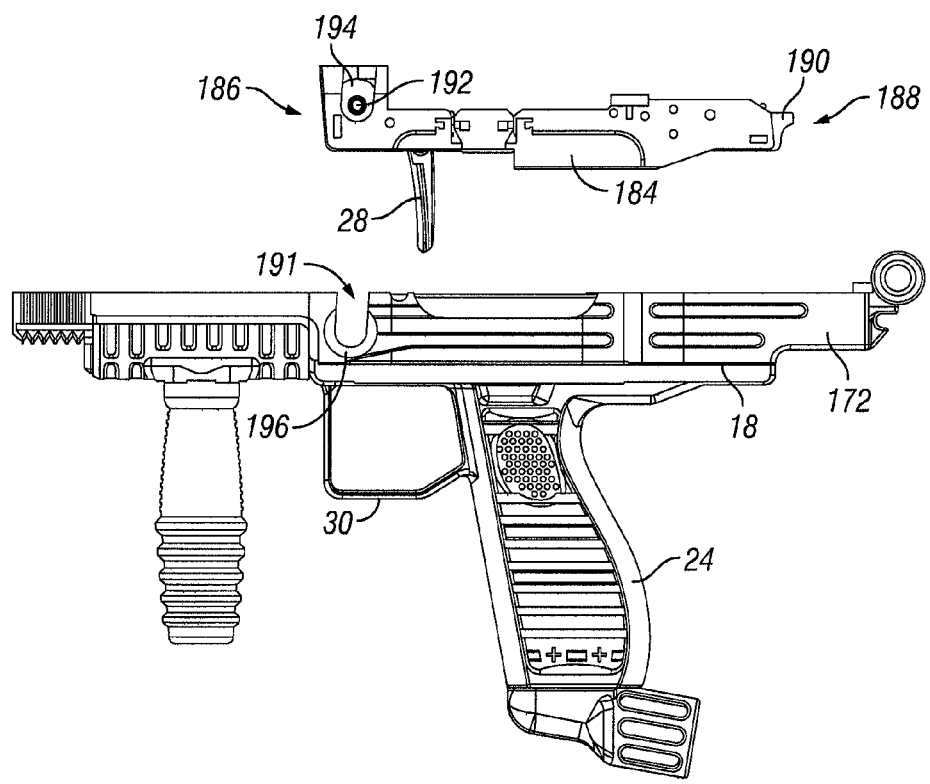
FIGS. 20-26 show an embodiment with a trigger box assembly that allows fast removal of trigger assembly components for repair and/or servicing.

FIGS. 20-26 show an embodiment with a trigger box assembly 184 that allows fast removal of trigger assembly components for repair and/or servicing. FIG. 20 shows an example lower portion 172 of a receiver 18 (with the flip top portion 36 removed for purposes of illustration) with an example trigger box assembly 184 removed from the receiver 18. As shown, the trigger box assembly 184 includes a front end 186 and a rear end 188. In this example embodiment, a cavity is formed within the lower portion 172 of the receiver 18 that is configured to receive the trigger box assembly 184. Typically, the cavity is configured with respect to the trigger box assembly 184 for a snug fit to prevent lateral movement.

Figure 21:
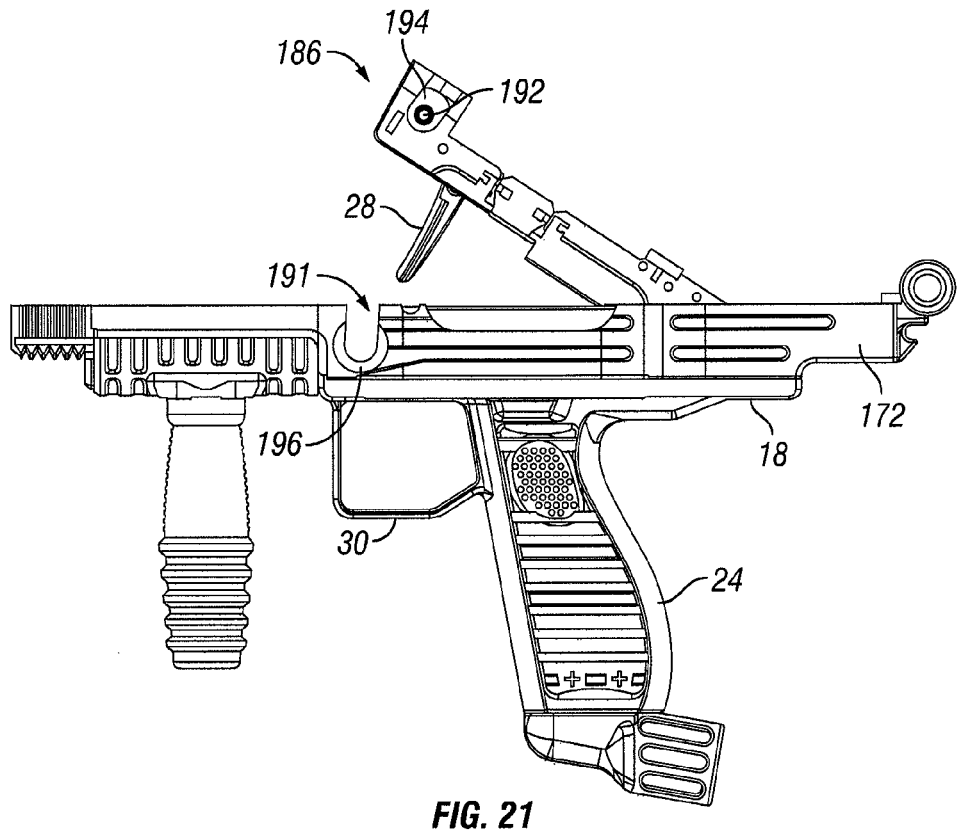
Figure 22:
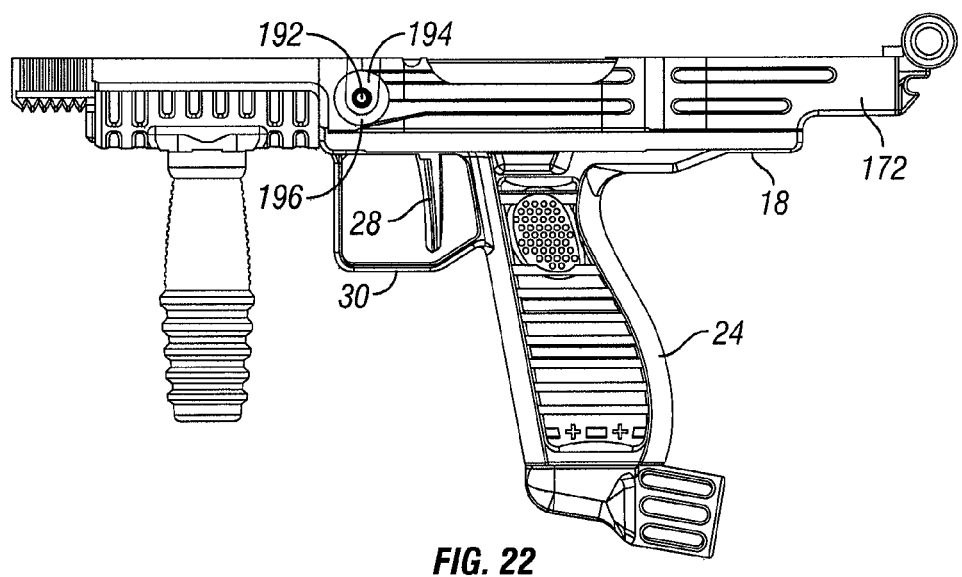
Figure 23:
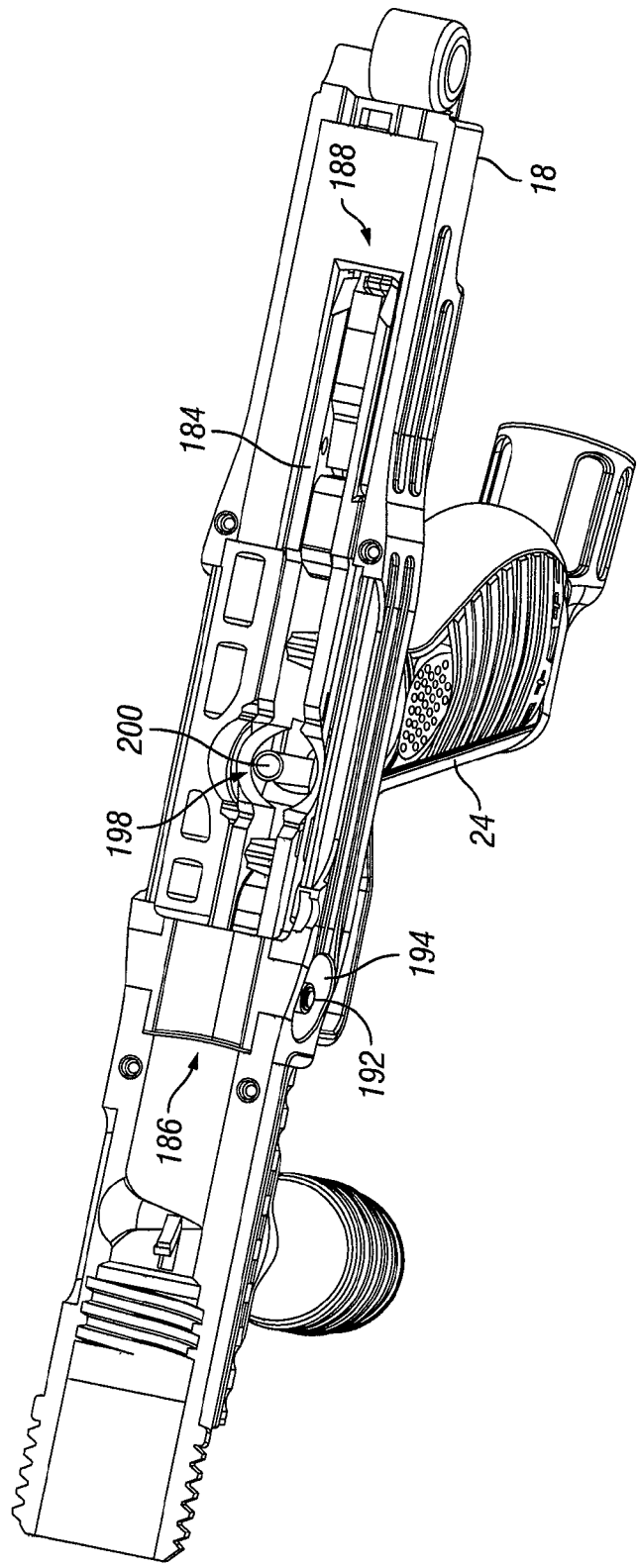

In the example shown, the trigger box assembly 184 includes a rearwardly extending tab 190 that is configured to be received by a pocket in the receiver 18 (as best seen in FIG. 23). This arrangement provides an interference fit to prevent movement of the rear end 188 of the trigger box assembly 184. As shown in the embodiment of FIG. 21, the user will first insert the rearwardly extending tab 190 into the pocket of the receiver 18 to reattach the trigger box assembly 184. Next, as shown in FIG. 22, the user may drop the trigger box assembly 184 into the receiver 18. In the embodiment shown, the receiver 18 includes a slot 191 that is dimensioned to receive a safety 192 that extends laterally from the trigger box assembly 184. In the embodiment shown, the trigger box assembly 184 includes a recessed portion 194 surrounding the safety 192. This recessed portion 194 in the trigger box assembly 184 forms a substantially uninterrupted, continuous surface with a recessed portion 196 on the exterior surface of receiver 18. FIG. 23 is a top perspective view of an example lower portion of the receiver 18 with the top portion removed. From this view, the cavity can be seen that is configured based on the external profile of the trigger box assembly 184. In the example shown, the trigger box assembly 184 includes a passageway 198 dimensioned to receive a compressed gas supply line 200. This configuration may be helpful, for example, when the gas supply line 200 extends through the grip 24 of the receiver 18 to a valve arrangement.

Figure 24:
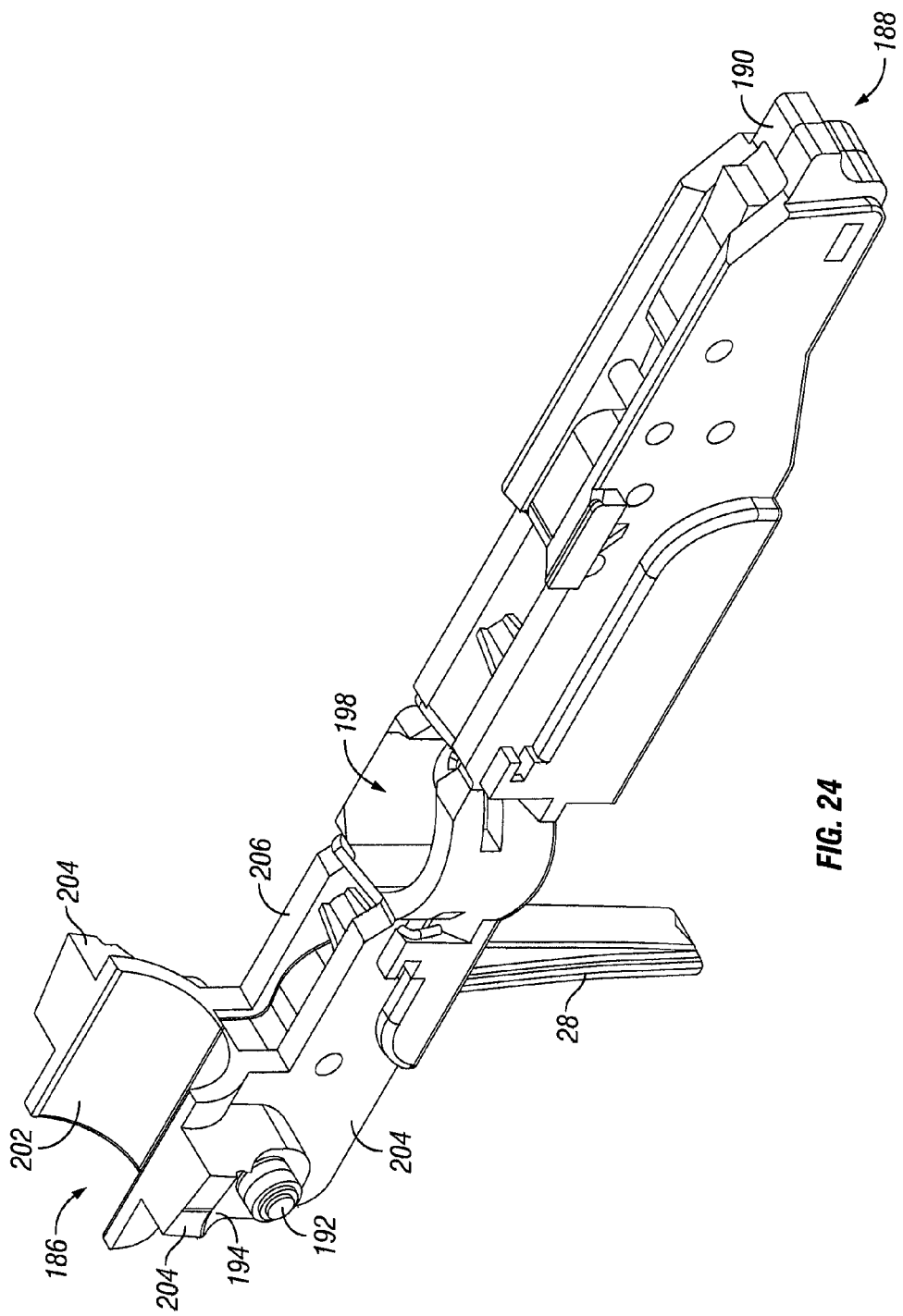

FIG. 24 shows a perspective view of the example trigger box assembly 184. In this example, the trigger box assembly 184 includes a first side plate 204 and a second side plate 206. As described in more detail below with reference to FIGS. 25 and 26, the firing assembly is disposed between the first side plate 204 and the second side plate 206. As shown, the front end 186 of the trigger box assembly 184 includes an upper arcuate portion 202 dimensioned to receive a projectile, such as a paintball. An extension 204 configured to be received in the slot 191 of the receiver 18 extends from the arcuate portion 202.

Figure 25:
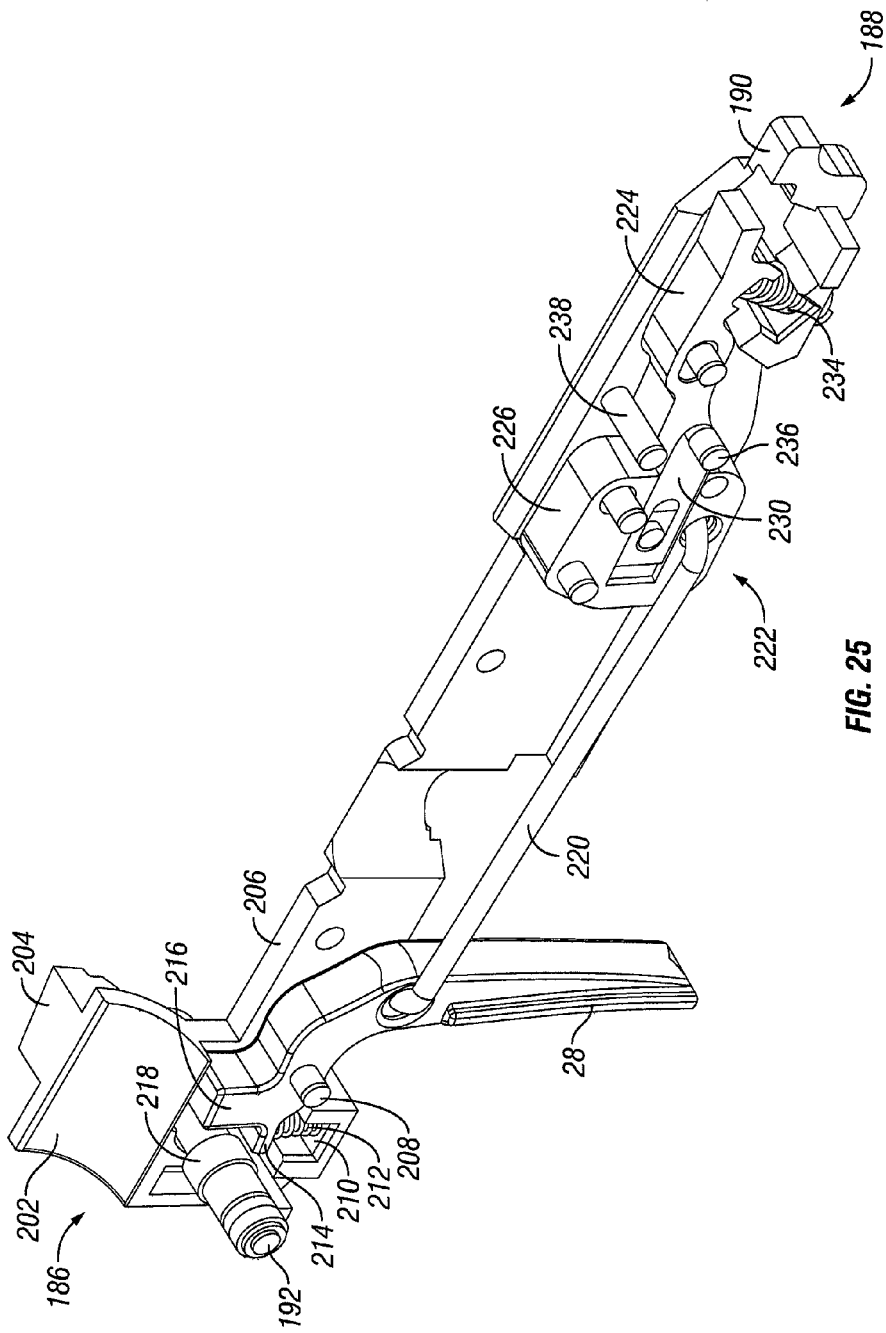
Figure 26:
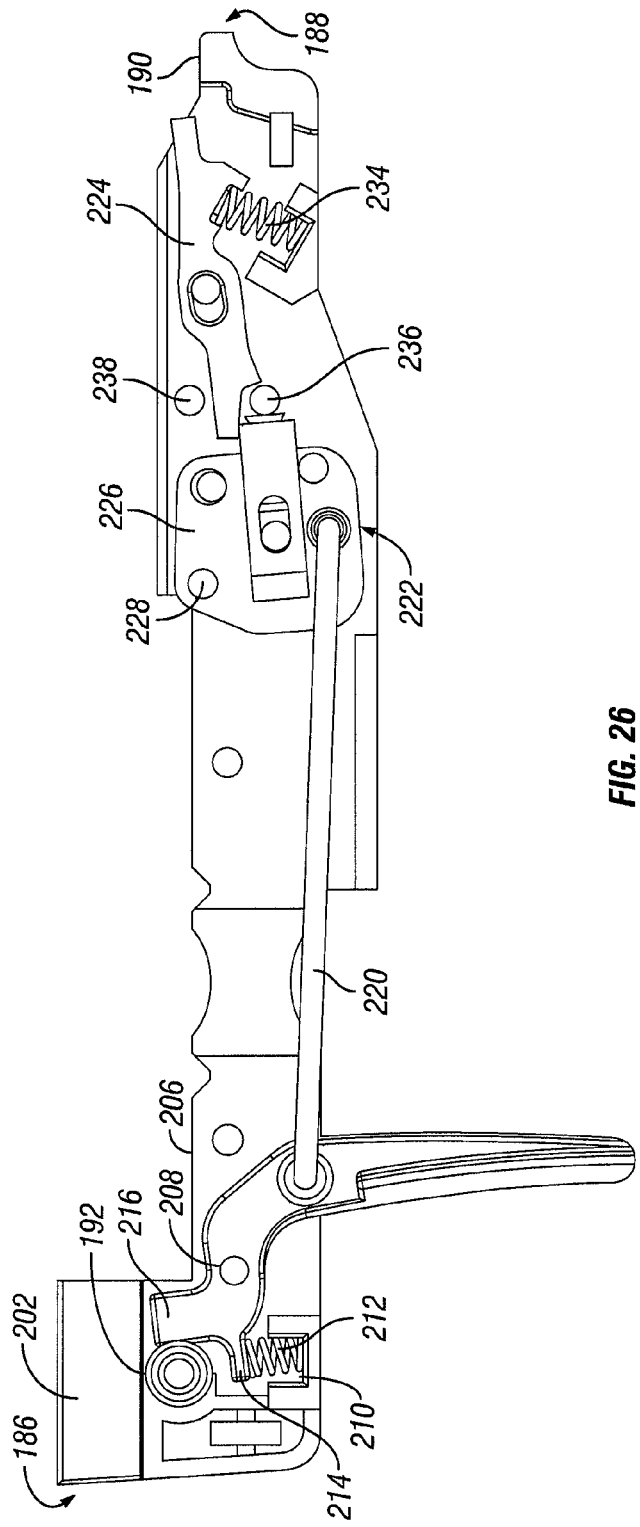

FIGS. 25 and 26 show a left side perspective view of the example trigger box assembly 184 shown in FIG. 24 with the first side plate 204 removed to show internal components of the assembly 184. In the example shown, the trigger 28 pivots on a pin 208 between a firing and relaxed position. As shown, a pocket 210 is defined in the second plate 206 for holding a biasing member 212 that urges the trigger away from the firing position. In this example, the trigger 28 has a proximal end that is actuated by a user's finger and a distal end with a first leg 214 and a second leg 216. As shown, the biasing member 212 acts upon the first leg 214 to urge the trigger 28 away from the firing position. In the embodiment shown, the safety 192 includes an enlarged portion 218 that prevents movement of the trigger 28 by creating interference with the second leg 216 when aligned with the second leg 216 in the safe position. As shown, the safety 192 is slidable to a position in which the enlarged portion is not aligned with the second leg, thereby allowing the trigger to move to the firing position. Although this type of safety and trigger are shown for purposes of example, one skilled in the art should appreciate that other safety assemblies and triggers, both mechanical and electrical in nature, are contemplated within the scope of this disclosure.

A linkage 220 has a first end received in the trigger 28 and a second end received by a slider assembly 222. The linkage 220 transmits movement of the trigger 28 to the slider assembly 222 to actuate a sear 224 when the trigger 28 moves to a firing position. In the embodiment shown, the slider assembly includes a plate 226 pivotably connected with a pin 228. A pin 230 limits movement of the plate 226 about the pin 228. The plate 226 includes a recess that receives a slider 230 for tripping the sear 224 to actuate the firing of a projectile. In the example shown, the sear 224 is pivotally mounted on a pin 232. The sear 224 has a first end that is actuated by the slider 230 when the trigger 28 moves to the firing position and a second end that is urged toward the slider 230 by a biasing member 234. The movement of the first end of the sear 224 is limited by a first pin 236 and a second pin 238.

Prior to the user pulling the trigger 28, the biasing member 212 urges the trigger 28 away from the firing position. When the user pulls the trigger 28, this action overcomes the biasing member 212 to move the linkage 220 (rearward in the example shown). This movement of the linkage 220 causes the slider assembly 222 to actuate the first end of the sear 224. The actuation of the slider assembly 222 with the first end of the sear 224 overcomes the biasing member 234 to trip the sear 224, which causes actuation of a valve arrangement to propel a projectile.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A paintball marker comprising:
   a barrel having a bore dimensioned to receive a frangible projectile;
   a receiver including a plurality of walls defining an interior cavity with a breech area;
   a valve arrangement configured to selectively allow flow between a supply of compressed gas and the breech area to propel the frangible projectile through the barrel;
   a front bolt movable between a first position and a second position, wherein the front bolt is configured to push the frangible projectile towards the barrel as the front bolt moves from the first position to the second position;
   a rear bolt connected to the front bolt with a linkage arm and movable between a cocked position and a firing position, wherein the rear bolt is configured to actuate the valve arrangement when the rear bolt moves from the cocked position to the firing position;
   a drive spring configured to urge the rear bolt toward the firing position;
   a firing assembly configured to selectively release the rear bolt in response to actuation of a trigger; and
   wherein at least one wall of the receiver is movable with respect to one or more other walls of the receiver between an open position that opens the interior cavity to expose a top portion of the front bolt and a top portion of the rear bolt for servicing the marker and a closed position that blocks access to the interior cavity.

2. The paintball marker of claim 1, wherein the wall that is movable with respect to the other walls extends longitudinally substantially the entire length of the receiver.

3. The paintball marker of claim 2, wherein the wall that is movable with respect to the other walls longitudinally divides the receiver in the open position along a plane that intersects the front bolt and the rear bolt.

4. The paintball marker of claim 1, wherein the wall that is movable with respect to the other walls pivots between the open position and the closed position.

5. The paintball marker of claim 4, wherein the receiver has a front end from which the barrel extends and an opposing rear end, wherein the wall that is movable with respect to the other walls has a proximate end pivotally connected to the receiver in close proximity to the rear end.

6. The paintball marker of claim 5, wherein the wall that is movable with respect to the other walls has a distal end adjacent to the barrel.

7. The paintball marker of claim 6, wherein the distal end has an arcuate shape to form a substantially uninterrupted surface with the bore in the barrel.

8. The paintball marker of claim 5, wherein the wall that is movable with respect to the other walls has a distal end with external threads that mate with internal threads of a fastener.

9. The paintball marker of claim 8, wherein a flange extending from the barrel is received by the fastener to form an interference fit between the barrel and the receiver.

10. The paintball marker of claim 9, wherein the flange is a snap ring.

11. The paintball marker of claim 1, wherein the receiver includes spaced-apart side walls having a top portion and a bottom portion, an upper wall extending between the side walls on the top portion of the side walls, and a bottom wall extending between the side walls on the bottom portion of the side walls, wherein the side walls, upper wall and bottom wall define the interior cavity dimensioned to receive at least a portion of the valve arrangement and firing assembly.

12. The paintball marker of claim 11, wherein the upper wall is movable with respect to the side walls between an open position that opens the interior cavity to expose the top portion of the front bolt and the top portion of the rear bolt and a closed position that blocks access to the interior cavity.

13. The paintball marker of claim 12, wherein the upper wall pivots between the open position and the closed position.

14. The paintball marker of claim 13, wherein the upper wall pivots about an axis that is approximately perpendicular to a longitudinal axis of the receiver.

15. The paintball marker of claim 12, wherein a flange extending from the barrel is received by the fastener to form an interference fit between the barrel and the receiver.

16. The paintball marker of claim 11, wherein the receiver has a front end from which the barrel extends and an opposing rear end, wherein the upper wall has a proximate end pivotally connected to the receiver in close proximity to the rear end.

17. The paintball marker of claim 16, wherein the upper wall has a distal end adjacent to the barrel.

18. The paintball marker of claim 17, wherein the distal end has an arcuate shape to form a substantially uninterrupted surface with the bore in the barrel.

19. The paintball marker of claim 16, wherein the upper wall has a distal end with external threads that mate with internal threads of a fastener.

20. The paintball marker of claim 19, wherein the upper wall extends substantially between the front end and the rear end of the receiver.

* * * * *